United States Patent [19]

Matsuno et al.

[11] E Patent Number: Re. 32,251

[45] Reissued Date of Patent: Sep. 23, 1986

[54] METHOD OF ELECTRIC WELDING TINFREE CANS

[75] Inventors: Kenji Matsuno, Yokohama; Hiroyuki Funamoto, Tokyo, both of Japan

[73] Assignee: Toyo Seikan Kaisha, Limited, Tokyo, Japan

[21] Appl. No.: 612,105

[22] Filed: May 18, 1984

Related U.S. Patent Documents

Reissue of:

[64] Patent No.: 4,334,138
Issued: Jun. 8, 1982
Appl. No.: 150,775
Filed: May 19, 1980

[30] Foreign Application Priority Data

Aug. 6, 1979 [JP] Japan ..... 54-99479
Aug. 23, 1979 [JP] Japan ..... 54-106696

[51] Int. Cl.[4] ..... B23K 11/06

[52] U.S. Cl. ..... 219/64; 219/83; 219/118

[58] Field of Search ..... 219/64, 83, 84, 119, 219/120, 118

[56] References Cited

U.S. PATENT DOCUMENTS

| | | | |
|---|---|---|---|
| 1,252,146 | 1/1918 | Murray | 219/81 |
| 1,300,603 | 4/1919 | Gravell | 219/83 X |
| 2,204,549 | 6/1940 | Murch | 219/83 |
| 2,254,657 | 9/1941 | Kennon | 219/89 |
| 2,280,111 | 4/1942 | Widell | 219/84 |
| 2,322,101 | 6/1945 | Winlock | 219/119 |
| 3,610,862 | 10/1971 | Erlandson | 219/84 X |
| 3,909,581 | 9/1975 | Stone | 219/119 |
| 4,160,892 | 7/1979 | Opprecht | 219/64 |
| 4,334,138 | 6/1982 | Matsuno | 219/64 |

*Primary Examiner*—Clarence L. Albritton
*Assistant Examiner*—C. M. Sigda
*Attorney, Agent, or Firm*—Martin A. Farber

[57] ABSTRACT

Disclosed are a method of and apparatus for making a welded metallic can body by effecting a mash resistance welding on a lapped side portion of a can body preform by means of a combination of a cooled elongated electrode and a cooled rotary electrode and, as required, with wire electrodes interposed between the lapped side portion and these electrodes. Also, disclosed are a tinfree steel welded can body and its making method wherein it is formed by a mash resistance welding on a lapped side portion of a can body preform made from tinfree steel, without requiring the removal of surface chromium film from the welded portion and its vicinity.

8 Claims, 32 Drawing Figures

METHOD OF ELECTRIC WELDING TINFREE CANS

Matter enclosed in heavy brackets [ ] appears in the original patent but forms no part of this reissue specification; matter printed in italics indicates the additions made by reissue.

The present invention relates to a method and apparatus of making welded can metallic bodies, as well as an improvement in welded can bodies, and, more particularly, a method of and apparatus for making welded can bodies and improvement in welded can bodies having a superior property of the side seam, particularly at the inner side of the can bodies.

A typical conventional method of making welded can bodies, such as for aerosol cans, beer cans, powdered coffee cans, 18 liter cans and the like has a step of effecting a seam welding on a side seam while passing the overlapped side edge portion of the can body preform through a pair of stationary roller electrodes and applying A.C. current between the electrodes across the overlapped side edge portion.

In this known method, it is a widely adopted measure to effect the seam weld while interposing wire electrodes between the rotary roller electrodes and the overlapped side edge portion.

This known method encounters a common problem that, since the welded portion at the inside of the can body has a poor property, it is often experienced that the can cannot have sufficient corrosion resistance depending on the content of the can, even when the welded portion at the inside of the can is coated with a protective lacquer, as summarized below:

(1) The welded portion is oxidized to generate a black oxidized film unless a special operation such as blowing of inert gas is adopted during the welding, particularly when a low-carbon steel or surface treated steel is used as the material. This oxidized film is fragile and exhibits a poor adhesion to the base metal, so that the inner protective coating applied to this oxidized film is apt to be delaminated or separated at the bend of the double seam to generate a tendency of corrosion of the base metal by the content.

(2) If the welding force is increased in order to reduce a step generated at the welded portion in the circumferential direction, a non-uniform extrusion of edge metal at the overlapped portion occurs. The gap beneath this extrusion is difficult to be perfectly insulated from the outside with a protective coating, or can be insulated only at a cost of large amount of protective coating.

The above described conventional method is often carried out by using tinfree steel consisting of low carbon steel the surface of which is coated with a thin metallic chromium layer and a chromium oxide layer. In such a case, the surface layer is locally removed in the area around the portion to be welded completely to expose the surface of the steel so that the welding is made between the steel surfaces closely and directly contacting with each other. At the welded portion thus formed and its vicinity steel surfaces remain exposed. The removal of the surface layer of tinfree steel has been made hitherto by various measures such as cutting, grinding and so forth. This, however, requires a considerably complicated and skilled technic. In addition, the exposed steel of the welded portion or therearound of the welded can exhibits a considerably poor adhesion to a lacquer film formed in the subsequent coating operation, as well as poor corrosion resistance, as compared with the tinfree steel surface before the removal of the surface layer.

Namely, in the resistance seam welding making use of two roll electrodes, the following phenomenon takes place, if the welding of tinfree steel is made without removing the surface layer.

The generation of heat is increased with the amount of the chromium oxide because the chromium oxide layer exhibits a much larger electric resistance as compared with the metal such as iron. It is considered that the large generation of heat between the roll electrode and the tinfree steel surface adversely affects the quality of the welding of tinfree steel. Generally, the contact between the surface of metallic sheets and the electrodes plays roles not merely for passing the electric current but also for transferring the heat from the metallic sheets to the electrodes. When heat generated on the sheet surfaces contacting the electrodes is too large, the heat generated between the contacting surfaces of two sheets and then transmitted to the outer surfaces of the sheets contacting the electrodes is prevented from being transferred to the electrodes. In consequence, the interface of the welding portion is molten and the so-called splash of molten iron is liable to be sputtered from the interface. In an extreme case, even the outer surface of the welded portion is molten undesirably.

It is, also, a common measure to use an A.C. current as the welding current. The amount of heat generated in the direction of seam weld is changed in accordance with the wave from of the A.C. current, i.e. the change of the welding current. In consequence, the welding condition is undesirably varied in the direction in which the welding proceeds. The splash of the molten iron is liable to be generated, particularly when the resistance seam welding is effected using two roll electrodes on tinfree steel, at the welded portions corresponding to the peak values of the wave form of A.C. current. On the other hand, there is a tendency that the satisfactory welding strength cannot be obtained owing to insufficient heat generated at portions corresponding to the zero value of the A.C. electric current wave form.

The splashes attaching to the surface of the welded can usually hinders considerably the subsequent repair of the welded portion by protective coating. Also, blow holes or cavities are formed at the welded portion as a result of generation of splash, resulting in a reduced corrosion resistance at the welded portion.

It is considered to be attributable to the above-stated reasons that the seam welding using two roller electrodes on tinfree steel without removal of the surface layer has been materially impossible.

The invention aims at overcoming the above-described problems of the prior art.

Namely, it is an object of the invention to provide a method of and apparatus for making a welded metallic can body wherein there is little formation of oxide film on the side seam of the inner surface of the can body without using the inert gas or the like.

It is another object of the invention to provide a method of and apparatus for making a welded metallic can body which has no or a slight step and extrusion of metal at the side seam, particularly on the inner surface of the can body.

It is still another object of the invention to provide a method of making a welded metallic can body capable of permitting a mash weld of tinfree steel without removing the surface layer containing a chromium coating film.

It is a further object of the invention to provide a welded metallic can body made of tinfree steel having a superior corrosion resistance and adhesion to organic coatings at the side seam particularly on the inner surface of the can body.

To these ends, according to this invention, there is provided a method and apparatus of making a welded metallic can body comprising the use of a cooled elongated electrode and a cooled rotary electrode wherein the elongated electrode is brought into contact directly or with a wire electrode interposed, with the inner surface of the lapped side portion of a can body preform.

According to the invention, the following metal sheets are used suitably but not exclusively for the can body: namely, black plate (non-coated low carbon steel), tinplate, tinfree steel (electrolytically chromic acid treated steel sheet), phosphate treated steel sheet, nickel plated steel sheet and the like surface treated steel sheet, aluminum or aluminum alloy sheet and lacquered sheets of these sheets.

In case of the lacquered sheets, it is preferred to adopt a so-called marging coating, leaving side marginal portions to be overlapped unlacquered.

The thickness of the sheet preferably but not exclusively is an ordinarily used thickness, i.e. about 0.12 to 0.4 mm, more preferably about 0.15 to 0.32 mm.

The metal sheet blank cut into the predetermined size is shaped into a can body preform having a circular or square cross-section having a side lapped edge portion. The lapped portion preferably has a width of between about 0.2 and 1.2 mm, more preferably 0.2 and 0.6 mm. A width smaller than about 0.2 mm makes it difficult to effect a uniform lapping, resulting in a deterioration of the weld strength and the generation of unwelded part. On the contrary, a width greater than about 1.2 mm causes an increase of the electric power and pressurizing force leading to a rapid wear of the electrode.

The invention will be fully understood from the following description of the preferred embodiments taken in conjunction with the accompanying drawings.

Figure 1:
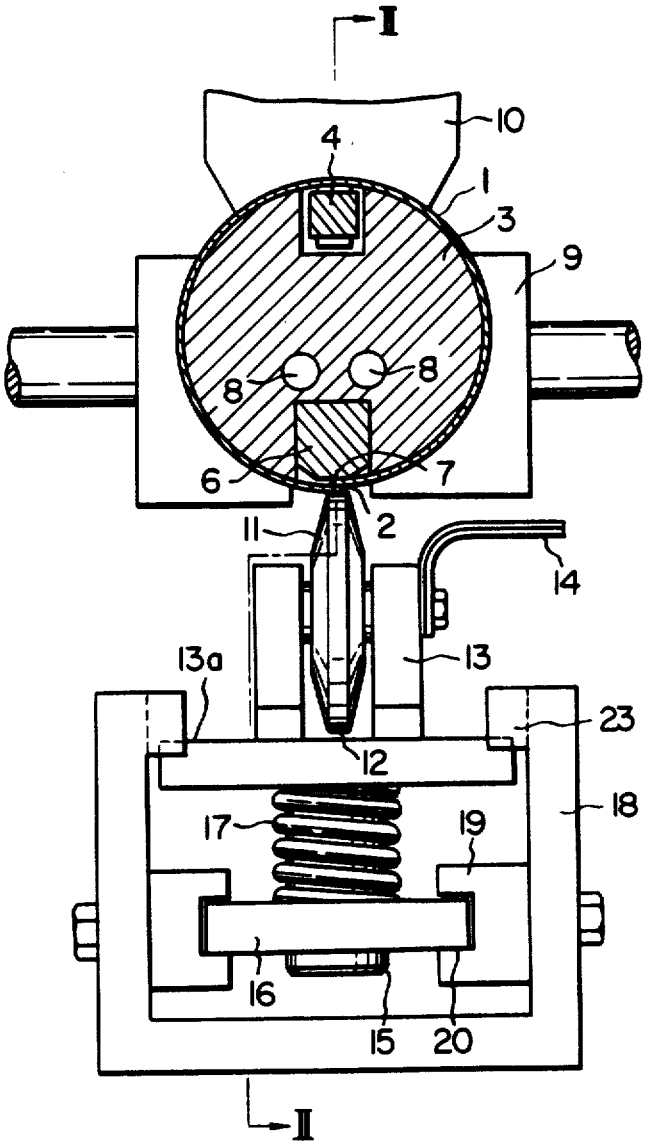
FIG. 1 is a side elevational view of apparatus in accordance with a first embodiment of the invention.
Figure 2:
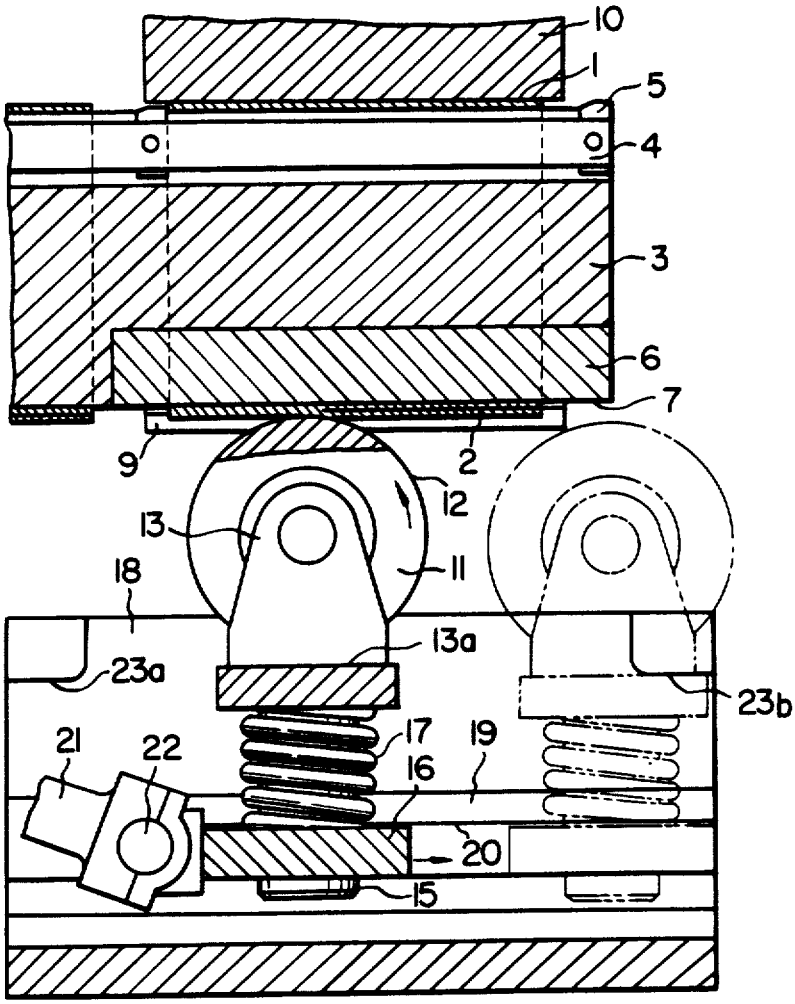
FIG. 2 is a vertical sectional view taken along the line II—II of FIG. 1.
Figure 3:
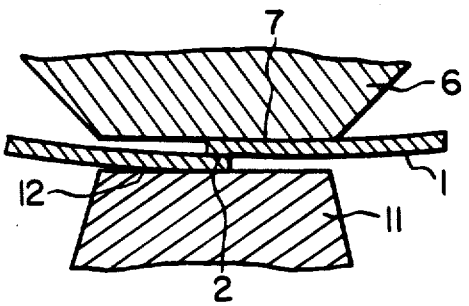
FIG. 3 is an enlarged vertical sectional view of a lapped portion and its vicinity during welding according to the first embodiment.

Referring first to FIGS. 1 and 2, a reference numeral 1 denotes a can body preform which has been formed and placed in such a manner that the lapped portion 2 is directed downwardly, by a preform forming machine (not shown) disposed at the left side of FIG. 2. The arrangement is such that the preform forming machine is provided at the left-side end of the mandrel 3, whereas the welding is effected at the right side of the mandrel 3. The preform is adapted to be transferred from the left to the right along the mandrel 3. A preform feeding bar 4 passes through a groove formed along the apex of the mandrel 3. The feeding bar 4 is provided with a plurality of fingers 5 at a constant interval. As the feeding bar 4 is moved to the right, the rear upper end of the preform 1 is engaged by the finger 5 so that the preform 1 is conveyed. Each finger 5 is so constructed that it can be depressed by a downward force and can resume the raised position by the force of a spring as it is relieved from the downward depression force.

An elongated electrode 6 is received by a bottom groove at the end of the mandrel 3. The elongated electrode 6 is constituted by an elongated metallic material such as copper or copper alloy so sized that at least the electrode surface 7 is longer than the length of the lapped portion, i.e. the height of the can body preform.

The electrode surface 7 has a planar shape corresponding to the shape of the lapped portion or is convexed in the widthwise direction. When the lapped portion 2 is not linear in such a case that the preform 1 is a barrel-like form, the electrode surface 7 has a curved surface conforming to the curvature of the lapped portion in the lengthwise direction. The electrode surface 7 has a width greater than that of the lapped portion 2. The electrode surface 7 is usually located on the extension of the circumferential surface of the mandrel 3.

The mandrel 3 is provided with a cooling bore 8 through which circulated is a coolant such as water, brine of, for example, −30° C., liquefied freon or the like, so that the elongated electrode 6 is cooled to ensure a sufficient cooling of the weld surface of the can body to avoid the oxidation and splash generation at the welded portion, as well as the wear of the electrode.

The elongated electrode 6 is connected to a welding power source through a feeder (not shown). The welding power source usually supplies an A.C. power of a commercial frequency, or of about 100–500 Hz in case of a high-speed can making.

A pair of hold-down wings 9 are provided at both sides of the electrode part of the mandrel 3, while a supporter 10 is disposed at the upper side of the same. The hold-down wings 9 and the supporter 10 are movable in the transverse and vertical directions, respectively, by means of cam mechanisms which are synchronized with the driving mechanism for the feeding bar 4, thereby to press the preform 1 against the mandrel 3 in advance to welding.

A rotary electrode 11 is disposed beneath the elongated electrode 6. The rotary electrode of this embodiment has a disc-like form and has an electrode surface 12 of a narrow-sleeve surface the width of which is greater than that of the lapped portion 2. The rotary electrode is internally cooled with a coolant passing through a bore (not shown) inside the electrode. The rotary electrode 11 is supported by a pedestal 13 through bearings and is connected to a welding electric power source through a feeder 14. To a lower part of the pedestal 13, fixed is a supporting rod 15 the lower part of which is loosely received by the aperture formed in a slide plate 16, so that the pedestal 13 is movable up and down relatively to the slide plate 16. A compression spring 17 surrounding the supporting rod 15 acts between the lower face of the pedestal 13 and the upper face of the slide plate 16, so as to impart a pressurizing force to the lapped portion 2 during the welding. Both side portions of the slide plate are slidable in the longitudinal direction of the mandrel 3 along the guide surfaces 20 of guides 19 which are installed horizontally at the inside of both sides of a supporting frame 18, causing a rotary motion of the rotary electrode 11 along the lapped portion 2. The sliding is effected by the rotation of a rotary disc (not shown) through a connecting rod 21 secured at its one end eccentrically to the rotary disc and a pin 22 interconnecting the other end of the connecting rod 21 and the slide plate 16.

A projection 23 is formed on the inner upper end portion of each side plate of the supporting frame 18 and is adapted to be engaged at its lower side by the upper surface 13a of the bottom plate of the pedestal 13, thereby to depress the rotary electrode 11 to provide a clearance greater than the thickness of the lapped portion 2 or the thickness of the welded portion between the top surface of the rotary electrode 11 and the electrode surface of the elongated electrode 6. Therefore, the introduction of the preform 1 into the electrode portion, as well as the delivery of the welded can body from the same, is never interferred by the rotary electrode 11.

The welding operation of this apparatus is as follows.

In the state that the rotary electrode 11 is positioned at the left-side end of the supporting frame 18 to permit the projection 23a and the upper face 13a of the pedestal bottom plate to provide a greater clearance between the top surface of the rotary electrode 11 and the electrode surface 7 of the elongated electrode 6 than the thickness of the lapped portion 2 of the preform, the preform 1 is transferred by means of the feeding bar 4 to a predetermined position in the elongated electrode position and is then stopped. Simultaneously, a pair of wings 9 are moved inwardly from both lateral sides, while the supporter 10 is moved towards the mandrel 3, thereby to press and fix the preform 1 on the mandrel 3. It is important that, in this state, the whole of the width of the lapped portion 2 is contacted by both of the electrode surfaces 7 and 12. This is essential in order to achieve a uniform reduction of thickness over the whole welded portion by mashing. Namely, if a portion in the widthwise direction of the lapped portion 2 fails to contact the electrode surfaces, such a portion is never mashed to leave a step, the height of which is almost equal to the thickness of the sheet blank. An impractically large amount of protective lacquer is required for completely coating this step to obtain a sufficient corrosion resistance against the chemical action of the can content.

Then, the slide plate 16 is moved to the right, so that the upper surface 13a of the pedestal bottom plate is disengaged from the projection 23a to permit a rotation of the electrode surface 12 on the electrode surface 7 of the elongated electrode. Thereafter, the electrode surface 12 of the rotary electrode rolls on the lapped portion 2 pressing the same by the force of the spring 17, during which electric current is made to flow between the rotary electrode and the elongated electrode across the lapped portion to effect the welding.

Usually, the frequency of the A.C. power applied to the electrodes is 50 to 60 Hz when the speed of rotation of the rotary electrode, i.e. the welding speed, is about 20 m/min. or lower. The frequency is increased as the welding speed is increased. It is to be noted, however, that the invention does not limit at all the frequency of the electric power and the wave form of the same.

The term "welding" broadly includes the melt weld and forge weld (solid phase weld). Generally speaking, the melt weld causes a melting of metal at the interface of the lapped portion to generate blow holes or cavities leading to leakage of the content. Also, splashing is generated from the interface of the welding portion. The splashed metal particles attach to the welded portion and its vicinity to make it difficult to effect a perfect repair by the protective coating. Further, the appearance and shape of the welded portion seriously detoriorates when the surface is molten. Also, the melt weld tends to incur a rapid wear of the electrode surface.

It is, therefore, desirable to select the weld current which permits a suitable forge welding or a welding including a local melt under the conditions causing no adverse effects such as splash and the like, in accordance with various factors such as the kind of the metal sheet, sheet thickness, surface condition, width of lapping, welding speed, welding force, wave form of the weld current and so forth.

The pressurizing force of the spring 17, i.e. the welding force is preferably selected to fall within the range of between 40 and 500 Kg, more preferably between about 60 and 300 Kg. A welding force smaller than about 40 Kg causes a non-uniform or excessively large electric resistance between the sheets contacting each other which leads to an unstable welding and a tendency of generation of the splash. Also, a welding force exceeding 500 Kg undesirably promotes the wear of the electrode. In order to reduce the step at the welded portion in contact with the elongated electrode, the welding force is preferably greater than about 60 Kg.

The diameter of the rotary electrode is about 50 mm, preferably about 100 mm or greater. The diameter smaller than about 50 mm provides only a small contact length between the electrode surface of the rotary electrode and the lapped portion. Therefore, when A.C. power is used, the rotary electrode presurizies only the area where the electric current is zero and its vicinity, i.e. only the areas where the heat generation is small, and then pressurizes only the area where the current takes the maximum value and its vicinity, i.e. areas where the heat generation is large, so that the heat generation is varied along the length of welding line. Therefore, if the welding current is increased, splashing is inevitably caused locally, whereas the reduced welding current will cause a local welding failure. In consequence, the range of electric current usable is undesirably reduced and it becomes impossible to increase the welding speed. The above inconvenience is gradually decreased as the diameter of the rotary electrode is increased. Namely, the uniform welding is effected with a wider range of weldable currents and a higher welding speed.

The thickness of the welded portion is determined by various factors such as welding force, temperature, speed and so forth, and is usually 1.0 to 1.8 times, preferably 1.0 to 1.6 times as large as the blank thickness. The larger thickness of the welded portion for a given blank thickness means a larger height of the step, resulting in an impractically large amount of protective lacquer coating.

Figure 4A:
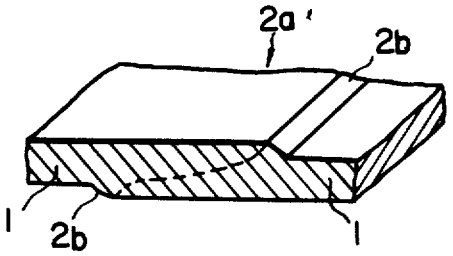
FIGS. 4a and 4b are schematic sectional views of the welded portion in accordance with the method of the invention.
Figure 4B:
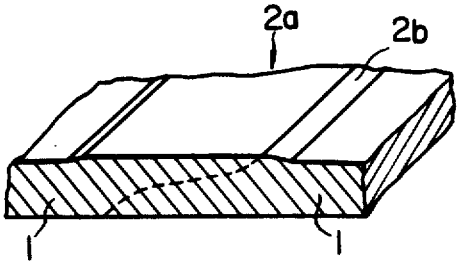
Figure 5:
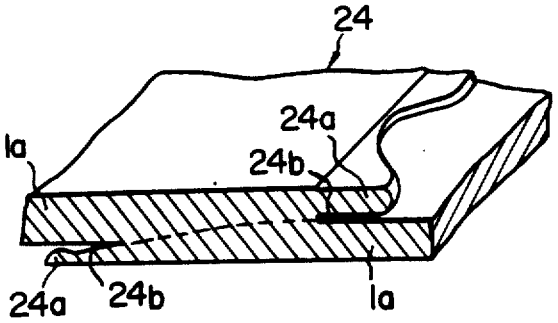
FIG. 5 is a schematic sectional view of welded portion formed by a conventional method.

FIGS. 4a, 4b and FIG. 5 show, respectively, the welded portions as obtained by the method of the invention and by the conventional method employing a pair of rotary rolls. In FIGS. 4a, 4b, the bottom side of the Figures corresponds to the elongated electrode side. As will be clearly understood from FIG. 5, when a pair of rotary electrodes are used, the metal extrudes at both sides of the lapped portion in the widthwise direction non-uniformly in accordance with the wave form of the A.C. current to form the extrusion 24a and a gap 24b under the extrusion. It is often experienced also that cavities are formed in the gap 24b. The welded portion 24 protrudes from the non-welded portion 1a at both of inner and outer surfaces.

FIG. 4a shows the case where the step 2b of the welded portion contacted by the elongated electrode is small, whereas FIG. 4b shows the case where the above step is negligibly small. As will be understood from these Figures, according to the method of the invention, the extrusion of metal and formation of the gap at the side facing the elongated electrode are negligibly small. Although a slight step is observed at the side facing the rotary electrode, the step is substantially linear and non-uniform extrusions of metal and gaps such as observed in FIG. 5 are not generated. It is considered that the flattened inner can body surface of FIG. 4b is attributable to a flat surface contact with the elongated electrode. The reason of the elimination of the metal extrusion at the outer surface of the can body, which contacts the rotary electrode, cannot be clarified yet.

The reason, however, may be assumed that the metal flow behavior during welding inducing the flattening of the can inside surface of the welded portion is different from that in case of FIG. 5.

According to the invention, a slight oxidation of metal may be caused at the outer surface which contacts the rotary electrode, but little oxidation of metal is observed at the inside of the can body. This is considered to be attributable to the fact that the welding can be effected without incurring a temperature rise to such a level as to cause the oxidation at the surface, due to a sufficient cooling effect provided by the large contact area between the welded portion and the electrode surfaces.

The rotary electrode 11 rolls, after passing the entire length of the lapped portion 2, on the electrode surface 7 of the elongated electrode 6, and is depressed downwardly due to an engagement between the bottom plate 13a of the pedestal 13 and the projection 23b (see the rotary electrode shown by two-dots-and-dash-line) to generate a gap for allowing the passage of the welded portion 2a between the electrode surfaces 7 and 12. Then, the feeding bar 4 is moved to the right without delay to transfer the welded can body to the right for the next step where located is a repairing device for the inner surface of the can body. Simultaneously, a second can body preform is fed into the elongated electrode section and the rotary electrode is returned to the left while effecting the welding by rolling along the lapped portion.

In this embodiment, the electrodes are worn or contaminated by building up of the surface film material of the surface-treated steel sheet, as the welding times increase. It is, therefore, necessary to suitably change the electrodes. This problem, however, is overcome by the following embodiment which makes use of wire electrodes.

Figure 6:
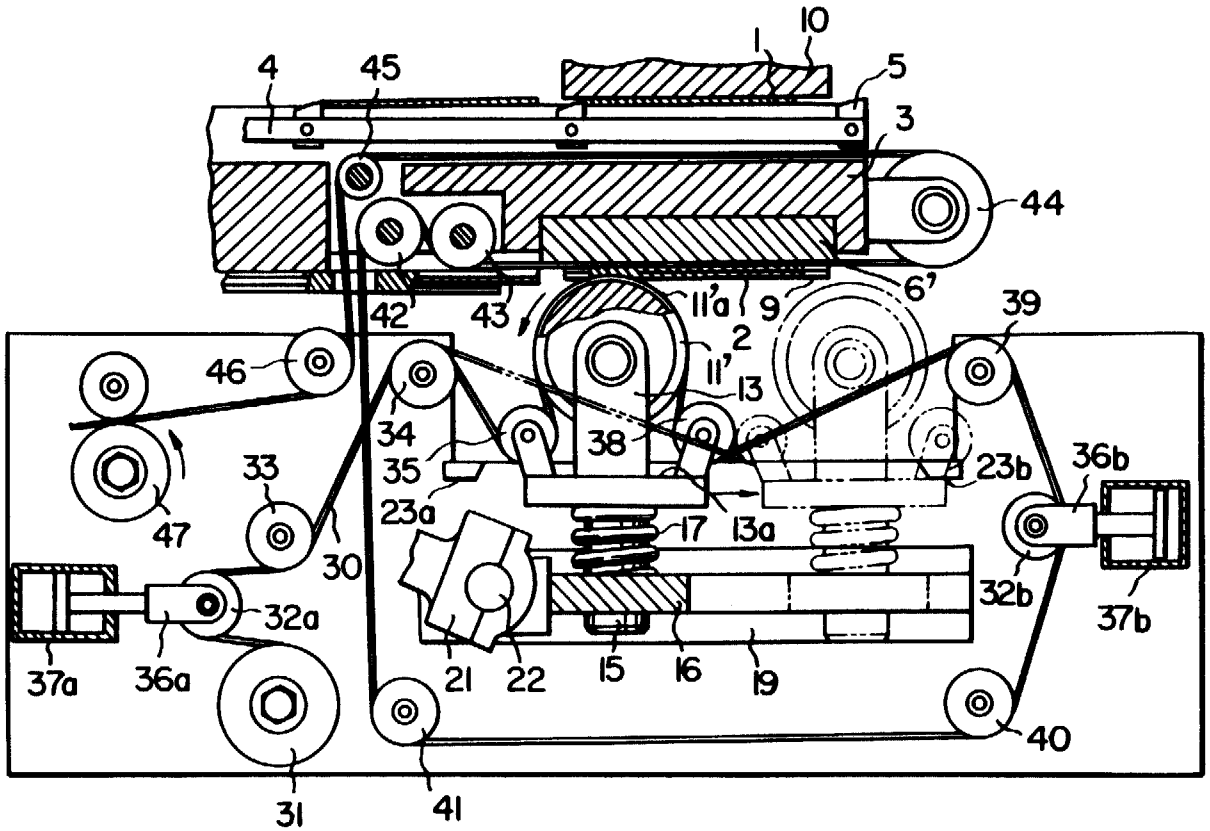
FIG. 6 is a front elevational view of apparatus in accordance with a second embodiment of the invention.

Referring to FIG. 6 in which the same reference numerals are used to denote the same members or parts with those of FIGS. 1 and 2, a rotary electrode 11' is disposed under the elongated electrode 6'. A peripheral groove 11'a for receiving a wire electrode 30 is formed in the electrode surface of the rotary electrode 11'.

The wire electrode 30 is introduced into the peripheral groove 11'a of the rotary electrode 11 from a pay-off reel 31 via the dancer roll 32a, guide rolls 33, 34 and 35. Dancer rolls 32a and 32b are respectively attached to the ends of the piston rods 36a and 36b which are respectively movable in air cylinders 37a and 37b the internal air pressure in which is maintained constant irrespective of the movement of the pistons. The wire electrode 30 passing through the rotary electrode 11' moves through the guide groove 6'a (see FIG. 7) of the elongated electrode 6' via guide rolls 38 and 39, dancer rolls 32b, guide rolls 40, 41, 42 and 43. Thereafter, the wire electrode makes a 180° turn at the guide roll 44 and is wound by a winding reel (not shown), after passing a tension roll 47.

Figure 7:
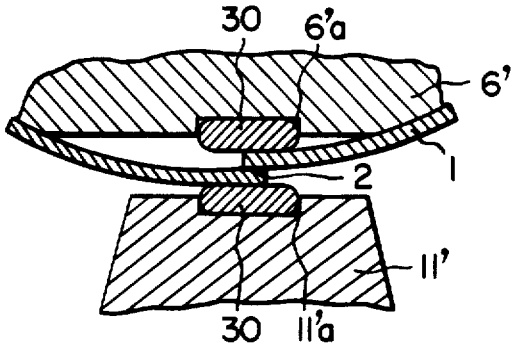
FIG. 7 is an enlarged vertical sectional view of a lapped portion and its vicinity during welding according to the second embodiment.
Figure 8:
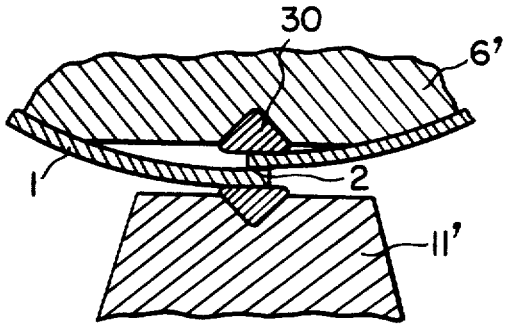
FIG. 8 is an enlarged sectional view of a lapped portion and its vicinity, wherein there is used a wire electrode having a different profile from that used in FIG. 7.

The wire electrode 30 is made of copper or its alloy and is shaped by rolling to have parallel upper and lower surfaces as shown in FIG. 7. The shape of the wire electrode can have a large variety, as long as it has a curvilinear surface corresponding to the shape of the lapped portion. For instance, it is possible to use an approximately triangular form as shown in FIG. 8. In the latter case, however, two sets of the pay-off and winding reels are required because two wire electrodes for the elongated electrode and the rotary electrode are employed. It is important that the width of the surface of the wire electrode 30 contacting the lapped portion 2 has to be greater than that of the lapped portion 2, in order to uniformly mash the entire part of the lapped portion 2.

The welding operation is conducted in a manner shown below.

When the rotary electrode 11′ is located at the left-side end of the guide 19 and the projection 23a and the upper surface 13a of the pedestal bottom plate are engaged to provide a larger gap between the surfaces of the wire electrode 30 on the elongated electrode 6′ and the wire electrode 30 on the apex of the rotary electrode 11′ than the thickness of the lapped portion, the can body preform 1 is fed by means of the feeding bar 4 to a position slightly ahead of the apex of the rotary electrode 11′ and is stopped at that position. At the same time, a pair of wings 9 are moved from both lateral sides, and the supporter 10 is moved from the upper side toward the mandrel 3, thereby to press and fix the can body preform 1 on the mandrel 3. Then, the slide plate 16 is moved to the right to disengage the projection 23a from the upper surface 13a of the pedestal 13. Thereafter, as soon as the wire electrode portion on the rotary electrode reaches the lapped portion 2 after rolling on the wire electrode portion on the elongated electrode over a small distance, the current supply is started. The rotary electrode 11′ then moves to the right rolling in the counter-clockwise direction while pressing with the wire electrode interposed the lapped portion 2 by the force of the spring 17. Meanwhile, the current flows between the rotary electrode and the elongated electrode, via the wire electrode, the lapped portion and the wire electrode, and the welding is conducted. The current supply is ceased at an instant at which the rotary electrode 11′ has passed the entire length of the lapped portion 2, thereby to complete the welding.

Thereafter, the rotary electrode is depressed downward by the mutual engagement between the pedestal bottom plate 13a and the projection 23b to form a gap between the upper and lower wire electrodes large enough to permit the welded portion to pass therethrough. Then, the feeding bar 4 is moved to the right to transfer the welded can body to the right for the next step. Simultaneously, a second can body preform is brought to the elongated electrode. During the rightward movement of the feeding bar 4, the wire electrode 30 is pulled by means of the tension roll 47 so that the new electrode portion is supplied onto the elongated electrode 6′.

The pay-off reel 31 is stopped during the rightward movement of the rotary electrode 11′. The slight elongation of the wire electrode 30 during the welding is absorbed by the dancer roll 32b, while the dancer rolls 32a, 32b in cooperation absorb the change of length of the wire electrode portion between the guide rolls 34 and 39. As a result, the tension of the wire electrode 30 is maintained constant.

The welding of the next can body preform 1 is effected during the returning leftward movement of the rotary electrode 11′. Alternatively, the rotary electrode is reset at the left starting position without effecting welding and then makes welding in its second rightward stroke.

Hereinafter, a description will be made as to how the welded can body of tinfree steel is made by the described apparatus without removing the surface chromium layer of the welded portion and its vicinity.

The tinfree steel used in the invention preferably has a metallic chromium layer of 20 to 200 $mg/m^2$ and a chromium oxide layer thereupon containing 5 to 30 $mg/m^2$ of chromium. Usually the chromium oxide layer mainly consists of hydrated chromium oxide.

The present inventors have found out that the welding of tinfree steel can be performed without removing the surface chromium layer when the welding is effected under the following conditions of the initial width of the lapped portion of 0.2 to 1.2 mm, the welding force of 40 to 500 Kg, the ratio of the width of the lapped portion L mm to the welding force W Kg falling on $1/1000 \leqq L/W \leqq 1/100$, and the radius of curvature of the rotary electrode of 50 mm or greater, preferably 75 mm or greater.

An initial width of the lapped portion smaller than 0.2 mm makes it difficult to obtain a uniform lapping, resulting in a deterioration of the welding strength or a generation of unwelded parts, whereas a lapping width exceeding 1.2 mm requires impractically large welding force and welding current to ensure a large contact length between the welded portion and the electrodes by mashing the welded portion, resulting in a rapid wear of the electrode and deteriorated appearance of the weld can body. Also, a welding force below 40 Kg causes an unstable pressurizing action during the movement of the rotary electrode in welding operation which will unstabilize the welding, while a welding force in excess of 500 Kg causes an impractically rapid wear of the electrode. Further, as will be mentioned in connection with Example 3, the instantaneous contacting length between the electrodes and the welded portion is reduced due to low welding force when the value of the ratio L/W exceeds 1/100. This value also cannot ensure uniform contact electric resistance. Therefore, splash of molten iron is often generated at the welded portion or the welding strength is reduced. On the other hand, the value of the ratio L/W less than 1/1000 causes the lapped portion to be mashed easily to the thickness near the original thickness of the blank due to an excessive pressure without being sufficiently heated, so that the contact electric resistance is extremely reduced, or the portions of two steel sheets other than the lapped portion are contacted by the electrodes to permit the electric current to pass through the former portions. In consequence, even with the increase of the welding current, heat at the interface of the lapped portion is not sufficiently generated which is apt to result in unwelded portions.

A radius of curvature of the rotary electrode smaller than 50 mm provides only a small contact length between the electrode surface of the rotary electrode and the lapped portion to afford only a small cooling effect so that the splash is easily generated, or the welding strength is reduced locally if the welding is made at ordinary pitch. Thus, such a small radius of curvature of the rotary electrode cannot be used practically for the welding of tinfree steel.

Figure 9:
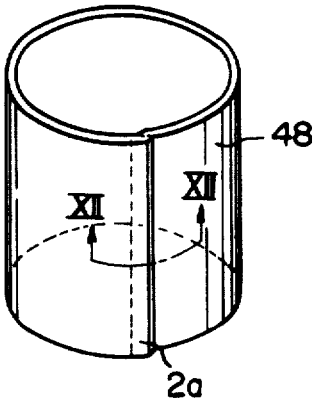
FIG. 9 is a perspective view of a welded can body in accordance with an embodiment of the invention.

In the welded can body 48 (FIG. 9) of tinfree steel obtained by the invention, the thickness of the welded portion is determined by factors such as welding force, temperature, speed and so forth. The thickness, however, preferably falls between 1.0 and 1.6 times as large as that of the blank sheet.

According to the invention, neither the extrusion of metal due to movement of the metal nor the generation of the gap takes place, even when the thickness of the welded portion is reduced to almost the thickness of the blank sheet so that the repair of the welded portion by the protective lacquer is very much facilitated.

In addition to the described method, as shown in Example 6, it has proved that the welding of tinfree steel can be made in a more stable manner by making use of wire electrodes to the surfaces of which beforehand attached by plating or the like measure is a metal of a low melting point. The term "low melting point metal" is used here to mean metals having melting points lower than 400° to 500° C., e.g. tin, zinc, lead or their alloys. The advantage brought about by the use of the low melting point metal is a remarkable increase of the maximum welding current under which the splash is not generated from the welding inter-surface. Namely, the welding can be made without the generation of splash, even under such a welding current that the splash may be caused if the low melting point metal is not used, so that a sound welded portion can be obtained.

The low melting point metal between the electrode and the tinfree steel is molten, although it may be molten locally, by the welding heat to provide following favorable influences in the welding of tinfree steel. Firstly, the low melting point metal in the molten state generally exhibits good heat and electric conductivities, and can fill local gaps between the wire electrode and the tinfree steel surface, so that the heat generation at such gaps is reduced. In consequence, the transmission of heat from the welding interface to the steel sheet and further to the electrodes is increased even when the welding condition is changed to increase the heat generation at the welding interface of tinfree steel, so that it becomes possible to prevent the occurence of splash even under such a condition.

Secondly, the lapped portion of the tinfree steel can body preform is mashed by the wire electrode to extend in the circumferential direction. In consequence, the surface film or layer on the tinfree steel is also elongated in the circumferential direction. However, generally, the surface film or layer on the tinfree steel is fragile and liable to be broken. If the surface film or layer on the tinfree steel is broken to generate a mass of chromium oxide, the heat generation is increased at that portion possibly to cause the splashing. In this connection, it is thought that the molten low melting point metal acts as a kind of lubricant which stretches the surface film more uniformly. In consequence, the contact electric resistance between the wire electrode and the tinfree steel becomes more uniform so that the welding of tinfree steel can be conducted under a large variety of welding conditions.

The amount of the low melting point metal may be only small. A too large amount of low melting point metal causes an excessive lubrication leading to a slip between the welding electrode and the tinfree steel. For this reason, the thickness of the low melting point metal layer attached beforehand to the surface of the wire electrode is not greater than 30 microns, preferably less than 20 microns.

The reason why the good mash weld under the predetermined welding condition without removing the surface chromium layer of tinfree steel is achieved according to the present invention, is considered that a large contact length, i.e. contact area, of the lapped portion in the direction of the seam is ensured owing to the use of the elongated electrode and the rotary electrode of a relatively large radius of curvature.

Figure 10:
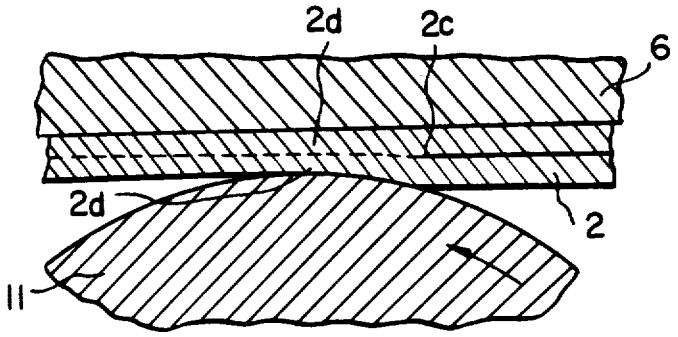
FIG. 10 is an enlarged schematic vertical sectional view of a lapped portion and a welded portion around the electrodes in the state of welding.
Figure 11:
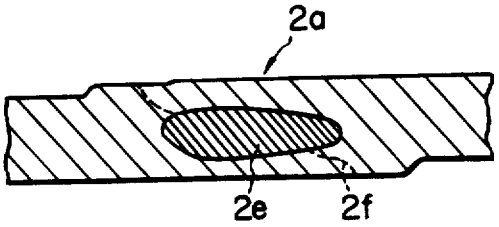
FIG. 11 is a schematic sectional view of a welded portion of the can body in accordance with the invention.

Namely, referring to FIG. 10, even when the heat generation at the interface 2c of the lapped portion 2 having a large electric resistance has grown to such a level as to cause a melting of the interface, the surface layer 2d of the lapped portion 2 is sufficiently cooled because of large contact areas with the electrodes 6 and 11. In consequence, as shown in FIG. 11 (see FIG. 27), a solid phase weld 2f is formed in the surface layer so that the melted portion 2e is confined within the welded portion 2a. This is thought to be the reason why the splashing is suppressed.

Secondly, the variation of weld condition along the length of the seam, attributable to the wave form of the A.C. welding current, is suppressed owing to the increased contact area between the rotary electrode 11 and the lapped portion 2.

The welding length corresponding to a half cycle of welding A.C. current is generally referred to as a welding pitch. In the resistance seam welding particularly of tinfree steel, a heat generation distribution along the seam is formed on the welding interface corresponding to the wave form of the A.C. current, i.e. the amount of welding current, if the instantaneous contact length between the electrodes and the welded portion is equal to or smaller than the welding pitch, which results in a large fluctuation of the welded state in the direction of the seam.

On the other hand, as the instantaneous contacting length is increased over the welding pitch, cycles more than the half cycle of welding current flows through the welding interface, so that the heat generation at the welding interface becomes more uniform to produce a uniform quality of welding in the lengthwise direction of the welded seam.

Figure 12:
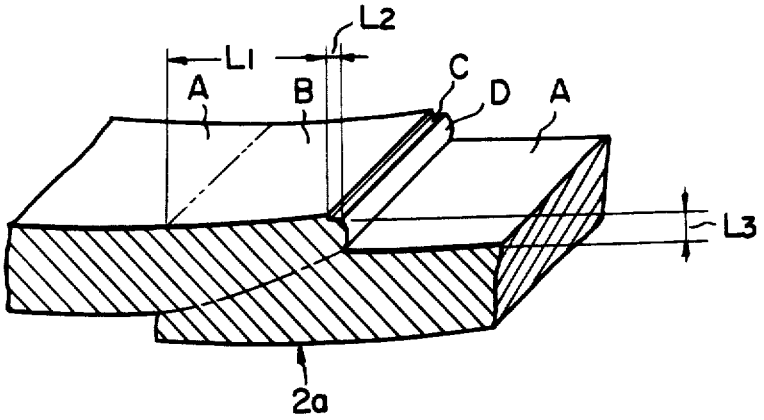
FIG. 12 is a schematic traverse sectional view taken along the line XII—XII of FIG. 9, illustrating the profile of the welded surface.

The surface of the tinfree steel welded can body 48 of the invention can be sorted into five regions in accordance with the surface condition. Namely, referring to the surface of the mash welded portion shown in FIGS. 12 and 13, a symbol A represents a surface region which is quite free of weld heat and has a original surface film, B represents a surface region which has been brought into contact with the welding electrode and has been subjected to pressure and electric current during the welding, C represents the completely exposed surface of the iron, formed by squeezing out during welding, D represents the exposed surface region of the iron remaining as the step composed of the remained cut edge of the lapped portion of the can body preform, and E represents the region in which the surface layer has been greatly destructed due to heating or deformation of the lapped portion during welding or the amorphous chromium oxide has been transformed almost perfectly into crystalline chromium oxide ($Cr_2O_3$) whose adhesion to the matrix iron is poor. In the welded portion in which the step shown in FIG. 12 is comparatively large, the above-mentioned region E is limited to a comparatively narrow area.

The present inventors have picked up samples of surface film of the welded portion for an observation by an electron microscope and confirmed the following facts. In the region B contacted by the electrodes, the surface film is in a state stretched toward the squeezed-out iron exposure region C or the step D and involves a crack which extends at a right angle to the direction of the stretch. In this surface film, a considerably large part of the chromium oxide remained without substantial tranformation and without substantial reduction of adhesion to the matrix steel and, hence, without deteriorating the adhesion of the coating material for repairing.

The amount of generation of cracking in the electrode contact region B of the welded portion at the inside of the can body usually is from 0 (zero) to 70% in surface area ratio, while the covering ratio of chromium oxide film is 30 to 100% in surface area ratio.

In this case, such a tendency is observed that the amount of generation of the cracks is increased with the increase of the mashing amount of the welded portion or of the welding current, as well as a tendency that the amount of cracking is increased in the area closer to the squeezed-out iron exposure region C.

As the mashing amount is increased, the height $L_3$ of the step region D is reduced, but the width $L_2$ of the squeezed-out iron exposure region C and the width $L_4$ of the transformed region E are increased. On the contrary, the height $L_3$ of the step is increased as the mashing amount is reduced. Usually, the width $L_2$ of the iron exposure surface C is about 0 to 0.25 mm, while the height $L_3$ of the step D is between 0 to 0.6 t wherein t is the sheet thickness at portions other than the welded portion. Also, the width $L_4$ of the region E of the transformed surface film usually is between 0 and 0.3 mm.

The perfect iron exposure regions like the regions C and D exist even in the welded portion of the tinfree steel welded can body. These regions, however, are sufficiently small in area. In fact, a test result shows that these regions of small area are satisfactorily protected against corrosion with an organic repairing material if the electrode-contacted region B near the above regions exhibits a good adhesion to the repairing material. The adhesion of the repairing material to the electrode-contacted region B depends on the amount of generation of crack in the surface film or the covering area ratio of the chromium oxide film. As will be understood from Examples 7 and 8, it has proved that a good adhesion of the repairing material is ensured if the ratio of residual surface area or the covering area ratio of the chromium oxide layer is greater than 30%.

The tinfree steel welded can body of the invention exhibits a good adhesion to the repairing material because the most part of the welded portion is covered with the surface layer consisting of the metallic chromium layer and the chromium oxide layer. In addition, neither void nor cavity exists in the welded portion because the mash welding is adopted. Therefore, when the can is packed with a foodstuff, the welded portion exhibits almost the same corrosion resistance as that of the other non-welded portion by a suitable selection of the repairing material, as will be understood from Examples 7 and 8. This superior characteristic could not be obtained in the conventional tinfree steel welded can.

Figure 14:
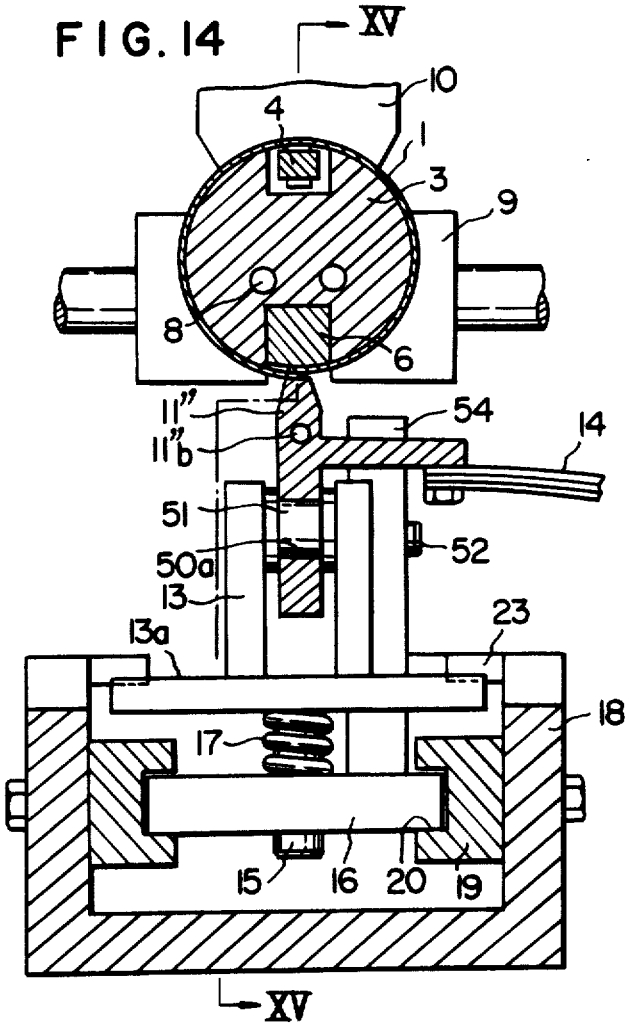
FIG. 14 is a side elevational view of apparatus in accordance with a third embodiment of the invention.
Figure 15:
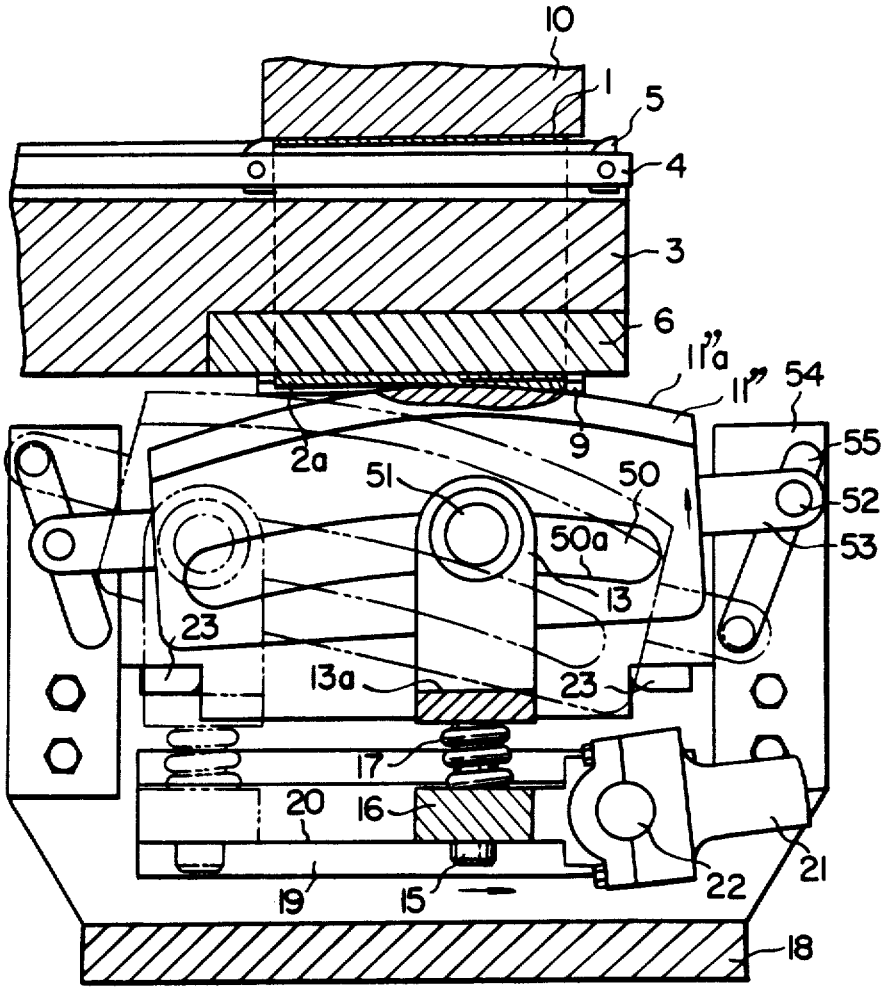
FIG. 15 is a partly sectioned front elevational view of the apparatus taken along the line XV—XV of FIG. 14.

FIGS. 14 and 15 show another example of the rotary electrode, in which the same reference numerals are used to denote the same parts or members as those used in FIGS. 1 and 2.

The rotary electrode 11'' has a generally rectangular shape one arc-shaped side of which is longer than the lapped portion 2 and constitutes an electrode surface 11''a. A cooling bore 11''b is formed in the vicinity of the electrode surface 11''a.

A guide aperture 50 having a guide surface 50a of the same radius of curvature as the electrode surface 11''a is formed in the barrel portion of the rotary electrode 11'' so as to extend in parallel with the electrode surface 11''a. The cam roller 51 extending through the guide aperture 50 is supported at its both ends by means of the pedestal 13. A roller holder 53 for attaching a cam roller 52 is fixed to both sides of the rotary electrode 11''.

The cam roller 52 is adapted to move along a guide aperture 55 formed in a guide plate 54, thereby to regulate the rotation of the rotary electrode 11''.

When the cam roller 51 has reached both ends of the guide aperture 50, the projection 23 engages the upper face 13a of the pedestal bottom plate to lower the electrode surface 11''a (see the rotary electrode shown by a two-dot-and-dash line), thereby to permit the introduction and delivery of the lapped portion 2 and the welded portion. The engagement between the projection 23 and the upper face 13a of the pedestal bottom plate is dismissed as the slide plate 16 is moved to the right along the guide 19, so that the rotary electrode 11'' rolls along the lapped portion 2 while pressing the latter by the force of the spring 17 through the action of the roller cam 51 thereby to effect welding.

As stated before, it is preferred to increase the diameter of the rotary electrode. This, however, increases the size of the equipment as a whole. Further, with a larger diameter the rolling inertia is increased as the welding speed is increased, and it becomes difficult to impart a uniform welding force along the weld line. The rotary electrode of this embodiment, however, offers an advantage that a large radius of curvature of the electrode surface is obtained with small space and inertia.

Figure 16:
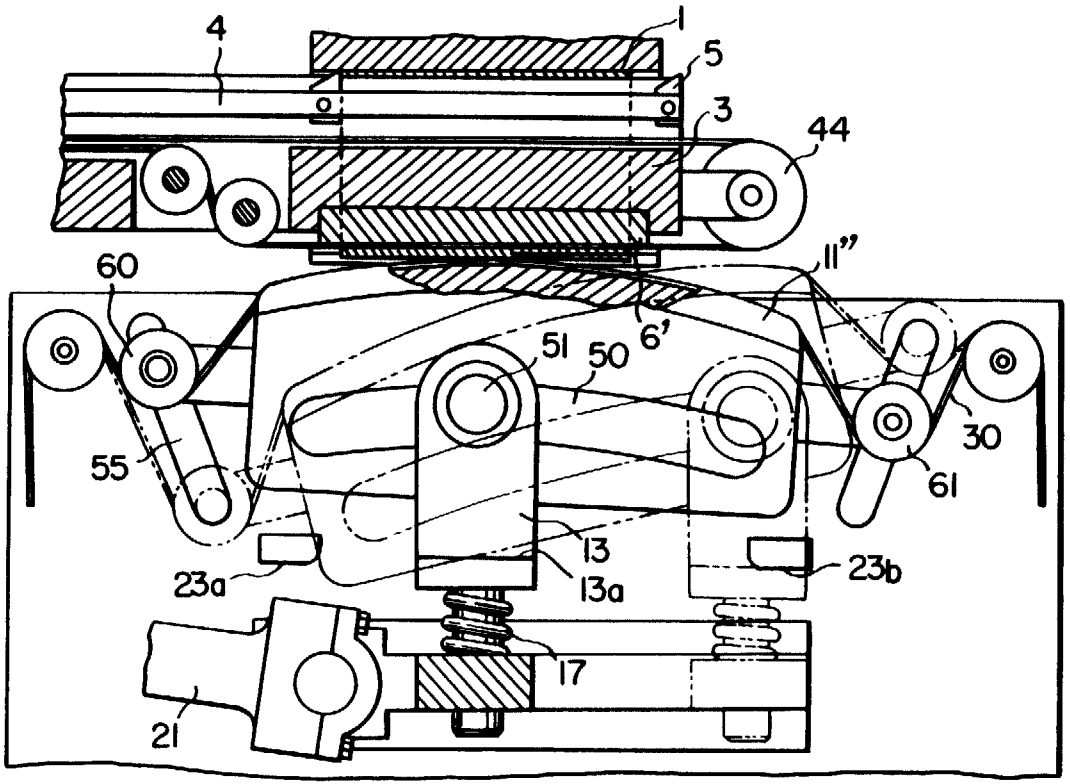
FIG. 16 is a partly sectioned front elevational view of apparatus in accordance with a fourth embodiment of the invention.

FIG. 16 shows an embodiment in which wire electrodes are used in combination with the rotary electrode shown in FIGS. 14 and 15. In FIG. 16, the same reference numerals are used to denote the same parts or the members of same or similar functions as those shown in FIGS. 14 and 15.

Although in FIG. 16 is omitted the illustration of equipment associated with the wire electrode 30, the construction and operation of this embodiment is almost equivalent to that shown in FIG. 14, except that the wire electrode 30 is used. In this case, the guide rolls 60, 61 of the wire electrode 30 are adapted to move together with the cam roller 51 along the guide aperture 55.

Figure 17:
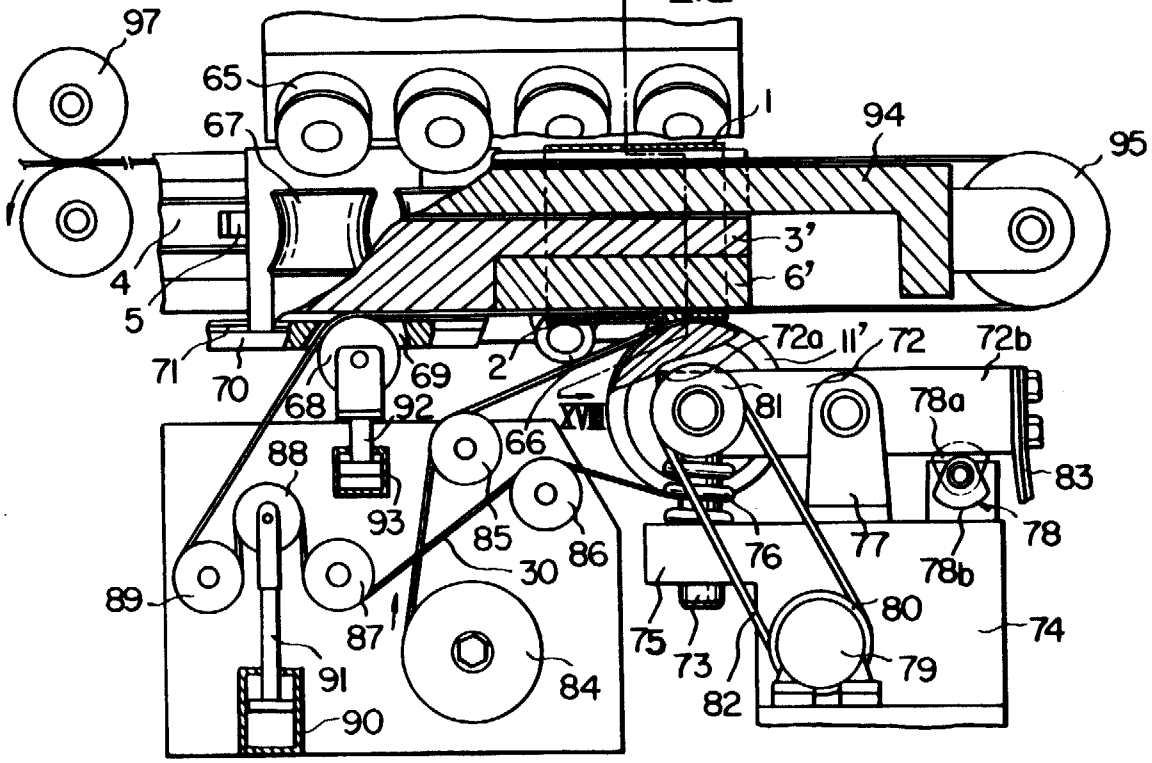
FIG. 17 is a partly sectioned front elevational view of apparatus in accordance with a fifth embodiment of the invention.
Figure 18:
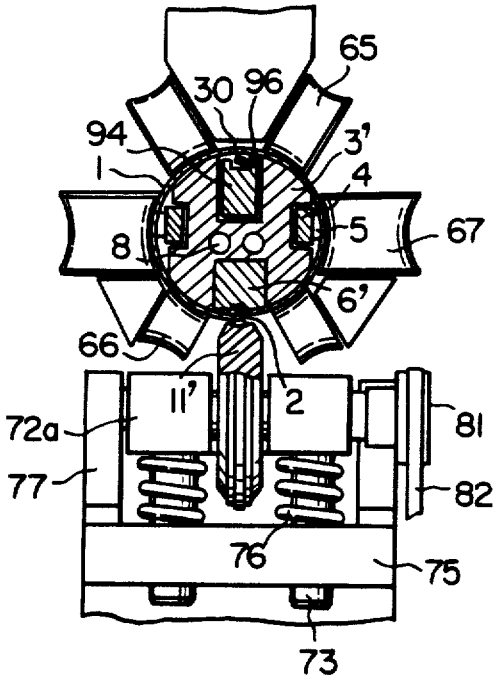
FIG. 18 is a partly sectioned side elevational view taken along the line XVIII—XVIII of FIG. 17.

FIGS. 17 and 18 show still another embodiment of the invention in which an elongated 6' is fixed to the lower end of the mandrel (or horn) 3' which is constructed so as to be driven reciprocatingly in the horizontal direction by a driving mechanism which is not shown, as a feature which distinguishes this embodiment from foregoing ones. A guide groove for guiding the wire electrode 30 is formed in the lower surface of the elongated electrode 6'. Also, a cooling bore 8 is formed in the mandrel 3'. The elongated electrode 6' is connected to the welding power source through a feeder (not shown) via the mandrel 3'. Reference numerals 65, 66 and 67 denote, respectively, a upper hold-down rollers, lower hold-down rollers and side hold-down rollers, each including eight rollers. A guide plate 70 having a through hole 69 for receiving a pressing roll 68 is attached to the lower part of the inlet section of the above hold-down rolls.

The preform 1 is pushed at its rear end by the finger 5 attached to the feeding bar 4, and moved along the mandrel 3' to reach the guide plate 70. Guide grooves 71 substantially opposing to each other are formed in both outer surfaces of the guide plate 70. The can body preform 1 is guided by the hold-down rolls 65, 66 and 67 such that the side margins thereof pass through these guide grooves 71. Two guide grooves 71 are gradually approached by each other toward the right-side, and are constructed so that a lapped portion 2 of a predetermined width is formed as the preform 1 is passed along the guide plate 70.

During the welding, the upper and lower hold-down rolls 65 and 66 positioned at the right side as viewed in FIG. 17, act to bring the can body preform 1 into close contact with the mandrel 3', and the side hold-down rolls 67 press the side surface of the preform 1, thereby to ensure that the lapped portion 2 maintains the predetermined state during axial linear movement of the preform 1 together with the elongated electrode 6'.

The rotary electrode 11' of a disc-like form is supported rotatably at the head 72a of a lever 72, and is cooled by a coolant passing through its inside. A peripheral groove for allowing the wire electrode 30 to pass therethrough is formed in the surface of the rotary electrode 11'. A supporting rod 73 disposed beneath the head 72a is loosely received by a through hole formed in a bracket 75 fixed to a stationary base 74, so that the head 72a is movable up and down against the force of a spring 76. The lever 72 is supported rotatably on a bearing pedestal 77 fixed to the stationary base 74. A cam 78 is provided on the stationary base 74 beneath the tail end 72b of the lever 72, so that the head 72a is movable up and down by the action of the cam 78.

The rotary electrode 11' is adapted to be driven by a motor 79 having a speed change gear, through the medium of pulleys 80, 81 and a belt 82. A conductor wire 83 for supplying the welding current is attached to the tail end 72b.

The wire electrode 30 is supplied into the peripheral groove of the rotary electrode 11' via the guide roll 85, under a suitable tension, from a pay-off reel 84, and is then introduced to the guide groove of the elongated electrode 6' through guide rolls 86, 87, a dancer roll 88, a guide roll 89, and a pressing roll 68. The dancer roll 88 is carried by a piston rod 91 which is movable up and down in an air cylinder 90 the pressure in which is maintained constant, thereby to absorb the slack of the wire electrode 30 which is caused by slight elongation of the electrode 30 during welding so as to maintain the tension of the wire electrode 30 constant.

The pressing roll 68 is attached to the upper end of the piston rod 92 which is adapted to be actuated by an air cylinder 93 to press the wire electrode 30 to retain the same in the guide groove of the elongated electrode 6'. The wire electrode 30 coming out of the guide groove makes a 180° turn at the guide roll 95 attached to the end of a support bar 94 and, after pulled out through an elongated groove 96 provided at an upper portion of the support bar 94 by a tension roll 97, is wound by a winding reel which is not shown.

The welding operation of this apparatus is made in a manner explained hereinunder.

The can body preform 1 is transferred along the mandrel 3' by the finger 5 via the guide plate 70, while the lapping width is regulated by the hold-down rolls 65, 66, 67, until the leading end thereof comes into the left side portion of the apex of the rotary electrode 11. In this state, the cam 78 takes a state 78a shown by a two-dot-and-dash line in FIG. 17, so that the rotary electrode 11' is lowered. Therefore, the rotation of the rotary electrode is never transmitted via the wire electrode 30 to the elongated electrode 6' which stands still. After positioning of the preform 1 in the predetermined portion on the elongated electrode 6', the cam 78 is rotated to take the state 78b shown by a full line in FIG. 17. Therefore or thereafter, the rotary electrode 11' starts to rotate as the motor 79 rotates. Then, by the action of the spring 76, the wire electrode on the rotary electrode 11' makes contact with the wire electrode on the elongated electrode 6' so that the elongated electrode 6' is moved to the right as the rotary electrode 11' rotates. In consequence, the lapped portion 2 of the preform 1 fixed to the mandrel 3' and the elongated electrode 6' by the upper and lower hold-down rolls 65, 66 comes into the space between the electrodes in such a manner as to be pressed by the elongated electrode 6' and the rotary electrode 11' through the medium of the wire electrode 30. The upward deflection of the mandrel 3' is prevented because it is push down by the upper hold-down roll 65 through the medium of the preform 1.

At the same time, the supply of electric current is commenced to start the welding. The supply of the electric current is continued until the lapped portion 2 completely passes the rotary electrode 11'. After the end of the welding, the cam 78 starts to rotate again to assume the state 78a shown by the two-dot-and-dash line in FIG. 17 and, simultaneously, the stopped rotary electrode 11' is depressed and the elongated electrode 6' and the welded can body are also stopped.

Thereafter, the welded can body is moved to the right as viewed in FIG. 17. At the same time, the mandrel 3' is moved to the left by a driving mechanism (not shown) as viewed in FIG. 17 to the starting position for the welding.

In the described embodiment, the rotary electrode 11' is used as the driving member, while the elongated electrode 6' constitutes a driven member. This, however, is not exclusive and the arrangement may be such that the rotary electrode 11' is driven by the reciprocating linear movement of the elongated electrode 6'.

Figure 19:
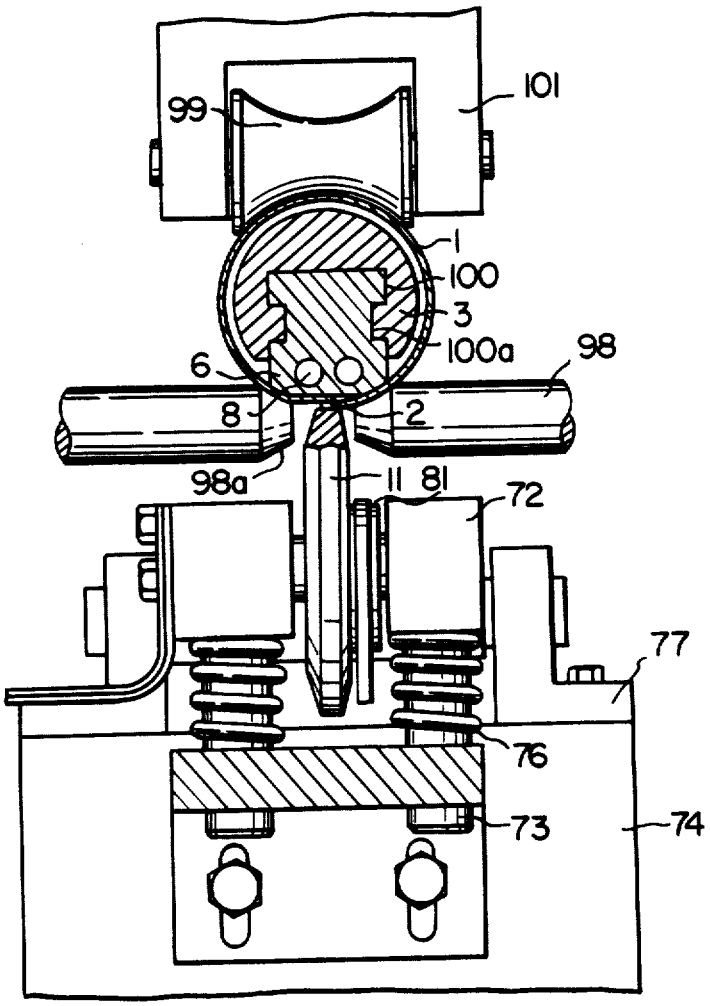
FIG. 19 is a partly sectioned side elevational view of apparatus in accordance with a sixth embodiment of the invention.
Figure 20:
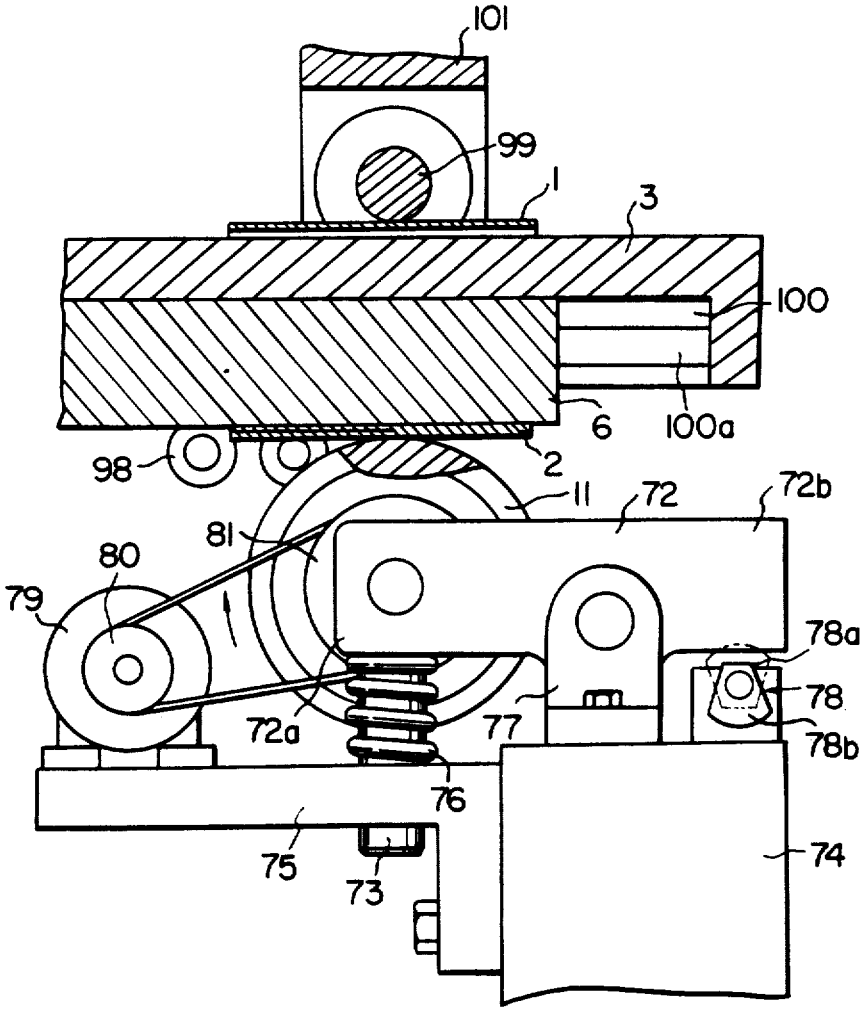
FIG. 20 is a partly sectioned front elevational view of the apparatus in accordance with the sixth embodiment of the invention.

FIGS. 19 and 20 show an embodiment in which the elongated electrode is moved during the seam welding as in the case of the embodiment shown in FIGS. 17 and 18, but no wire electrode is employed. The parts and members or functions same as those of the embodiment shown in FIGS. 17 and 18 are denoted by the same reference numerals.

The can body preform 1 is positioned on an elongated electrode 6 and a mandrel 3 by a plurality of pairs of lower support rollers 98 and an upper support roller 99. The elongated electrode 6 is placed in the mandrel 3 with the electrode surface directed downwardly for sliding movement along the slide surface 100. The slide surface 100 is provided with a projection 100a for preventing the dropping of the elongated electrode 6. The lower support rollers 98 are cantilevered. The end 98a of each lower support roller has a curved surface conforming to the lower face of the elongated electrode 6 to keep the can body preform 1 in close contact with the elongated electrode 6, so that the lapped portion 2 is preserved in a predetermined state during the linear movement of the can body preform 1 for the welding.

The upper support roller 99 is supported by a roller carrier 101. The arrangement is such that the lapped portion 2 maintains a predetermined width and position in the state in which a slight gap is formed between the can body preform 1 and the mandrel 3 in order to facilitate the movement of the can body preform 1 along the mandrel.

The rotary electrode 11 is rotated by the motor 79 through the pulleys 80, 81. The welding method of this embodiment is materially identical to that of the embodiment shown in FIG. 17 except that the wire electrode is not used.

Both of the embodiment under description and the embodiment shown in FIG. 17 have the following advantages: The rotary electrode stays at almost the same position, so that the mechanism as a whole is simplified and a uniform pressurizing is realized. It becomes also possible to increase the welding speed without substantial difficulty.

Although the invention has been described through its preferred forms the described embodiments are not exclusive and, needless to say, various changes and modifications may be imparted thereto without departing from the spirit of the invention.

Practical examples of the invention will be described hereinunder.

EXAMPLE 1

A can body blank of black plate (soft steel sheet) of 0.24 mm thick was formed to a preform having an inside diameter of 65.3 mm and a body length of 125.4 mm. A welded can body was made by effecting a welding on the lapped portion of the preform by the apparatus shown in FIGS. 1 and 2.

A.C. power of 50 Hz was used as the power source for welding. Chrome-containing copper electrode which is a commercially available electrode material for resistance welding was used. Table 1 shows the relationship between the welding force and the welding current (effective value of sineous curve current) with which a satisfactory welded portion was achieved, as obtained when the welding was conducted under the condition of the lapping width of 0.4 mm, the diameter of the rotary electrode of 300 mm and the welding speed of 12 m/min.

TABLE 1

| Welding force (Kg) | Range of welding current (A)* |
|---|---|
| 80 | 2,900–4,000 |
| 100 | 3,200–4,600 |
| 115 | 3,800–5,800 |
| 130 | 4,000–6,400 |
| 200 | 5,000–7,500 |
| 300 | 5,500–9,000 |

Note:
*Welding current below the lower threshold caused insufficient welding strength, while splash was generated by welding current in excess of the upper threshold.

Figure 21:
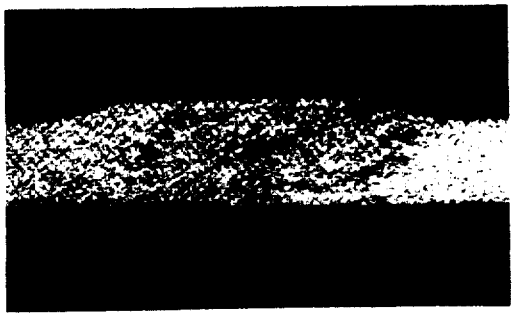
FIG. 21 is a metallurgical microscopic photo of the section of a welded portion formed from black plate in accordance with a method of the invention.

FIG. 21 shows the microscopic structure of the welded portion of a welded can body obtained under the condition of welding force of 130 Kg and welding current of 5000 A, at a section normal to the welding line (magnification 60, etched with 5% picral etchant). As will be seen from this photo, the lower side of the welded portion which was brought contact with the elongated electrode is mashed into a flat surface. Also, the extrusion of metal in the widthwise direction and the generation of gap beneath the extruded metal are not observed. Coloring due to oxidation was not observed in the lower side of the welded portion, although a slight coloring was observed in the upper side of the welded portion.

EXAMPLE 2

A can body preform having an inside diameter of 74.0 mm and a body length of 134.3 mm was formed from a tinplate of 0.24 mm thick (tin coating weight: 2.8 g/m$^2$). The lapped portion of this can body preform was welded by the apparatus of the type shown in FIGS. 17 and 18 to form a welded can body.

A.C. power of 50 Hz was used as the welding power. A commercially available electric soft copper wire of 1.5 dia. was rolled to have curved side surfaces and a generally rectangular cross-section and a width and thickness of about 2 mm and 1 mm, respectively, and was used as the wire electrode. The relationship between the welding force and the welding current (effective value of sineous curve current) with which satisfactory welding quality was achieved, under the condition of a lapping width of 0.4 mm, a rotary electrode diameter of 300 mm and a welding speed of 15 m/min. is shown in Table 2 below.

TABLE 2

| Welding force (Kg) | Appropriate range of welding current (A)* |
|---|---|
| 80 | 4,200–4,800 |
| 100 | 4,500–5,200 |
| 115 | 4,800–5,800 |
| 130 | 5,000–6,500 |
| 200 | 5,500–8,000 |
| 300 | 6,500–9,500 |

Note:
*Welding current below the lower threshold caused insufficient welding strength, while splash was generated by welding current in excess of the upper threshold.

Figure 22:
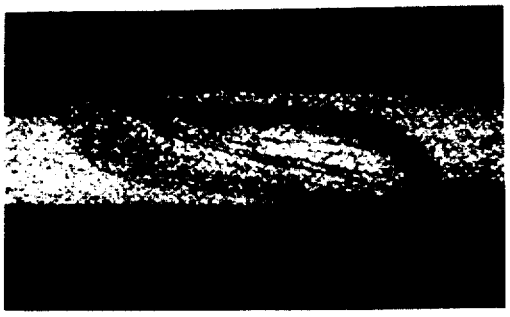
FIG. 22 is a metallurgical microscopic photo of the section of a welded portion formed from tinplate in accordance with the method of the invention.

FIG. 22 shows the microscopic structure of the welded portion of a welded can body obtained under the condition of the welding force of 130 Kg and the welding current of 5,500 A (magnification 60, etched with 5% picral). The elongated-electrode-contacted side of the welded portion is shown at the lower side of the picture. It will be seen that neither widthwise extrusion of metal not the gap beneath such an extruded metal is formed, although a slight step is observed. The same applies also to the upper side.

No coloring due to oxidation was observed at the inside of the welded portion, and the outer surface also showed little coloring due to oxidation. Coloring at the outer surface was completely eliminated by application of nitrogen gas to the outer side. Also, the welded portion was uniformly mashed in the direction of the weld line and exhibited a desirable shape.

COMPARATIVE EXAMPLE 1

A can body preform having an inside diameter of 74.0 mm and a body length of 134.3 mm was formed from a tinplate of 0.24 mm thick (tin coating weight: 2.8 g/m$^2$). The lapped portion of this can body preform having a lapping width of 0.4 mm was fed into a pair of opposing disc-shaped rotary electrodes through the medium of wire electrodes having curved side surfaces and a generally rectangular cross-section of about 2 mm wide and 1 mm thick made from soft electric copper, and was allowed to pass therethrough at a speed of 12 m/min.

while applying electric current between the two rotary electrodes so as to produce a welded can body. A.C. power of 50 Hz was used as the welding power. The diameter of the disc-shaped electrode placed inside the can body preform was 60 mm, while the diameter of the other disc-shaped electrode situated outside of the preform was 80 mm. The welding force acting on these electrodes was 40 Kg.

Figure 23:
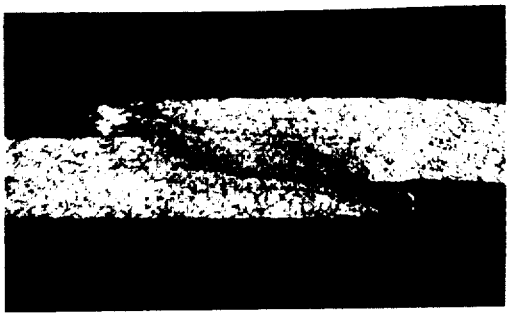
FIG. 23 is a metallurgical microscopic photo of the section of a welded portion formed from tinplate in accordance with a conventional method.

FIG. 23 shows the microscopic structure of the section of the welded portion (magnification 60, 5% picral etchant).

The portions of the inner and outer surfaces having a remarkably large extrusion of metal and a gap beneath the extrusion such as shown in FIG. 23 and the portions having a comparatively small metal extrusion were irregularly formed corresponding to the wave form of the electric current along the weld line. The both surfaces of the welded portion were oxidated and colored black-brown.

EXAMPLE 3

A can body preform having an inside diameter of 65.3 mm and a body length of 125.4 mm was made from a tinfree steel sheet of 0.23 mm thick having a metallic chromium layer of a chromium amount of 99 mg/m$^2$ and a chromium oxide layer having a chromium amount of 11 mg/m$^2$. The lapped portion of this preform was welded by the apparatus of the type shown in FIGS. 1 and 2 to form a welded can body. A.C. power of 50 Hz was used as the welding power. Chrome-containing copper which is a commercially available material for the resistance welding was used as the material of the electrode. A plurality of welding tests were conducted with different values of overlapping width L mm, welding force W Kg and radius of curvature R mm of the rotary electrode to determine the appropriate range of the welding current, i.e. the upper and lower thresholds of the welding current. In this case, the value of welding current at which the splash of molten iron beings of occur was defined as the upper threshold of the welding current, while the value of electric current at which the strength and the sealing performance of the welded portion become impractically low was defined as the lower threshold of the welding current. The adjustment of the welding current was made by changing the primary voltage of the A.C. welding power source, and the welding current (effective value of sineous curve) was measured during welding.

The appropriate range of the welding current, which was defined as the difference between the upper and lower threshold values of the welding current for the tinfree steel was determined by varying the lapping width L (mm) and the welding force W (Kg), under such a welding condition that the radius of curvature of the rotary electrode is 150 mm and the welding speed is 9 m/min. The appropriate range of the welding current exceeding 1000 A was evaluated as being excellent and marked as ⊙, the range between 500 A and 999 A was evaluated as being good and marked as O, the range between 0 and 500 A was evaluated as being acceptable and marked as Δ, and the case in which there is no appropriate welding current range was evaluated as being poor and marked as X. The results are shown in table 3.

From table 3, it will be seen that tinfree steel can be successfully welded when the ratio L/W of the lapping width L to the welding force W, which ranges from 40 Kg to 500 Kg, satisfies the following relation:

$$1/1000 \leqq L/W \leqq 1/100$$

TABLE 3

| Welding force W (Kg) | lapping width L (mm) 0.2 | 0.4 | 0.6 | 0.8 | 1.0 | 1.2 |
|---|---|---|---|---|---|---|
| 20 | X | X | X | X | X | X |
| 40 | Δ | Δ | X | X | X | X |
| 60 | O | Δ | Δ | X | X | X |
| 80 | O | O | O | Δ | Δ | X |
| 100 | O | ⊙ | ⊙ | O | Δ | Δ |
| 150 | O | ⊙ | ⊙ | O | Δ | Δ |
| 200 | Δ | ⊙ | ⊙ | O | O | Δ |
| 250 | X | ⊙ | ⊙ | ⊙ | O | O |
| 300 | — | O | O | ⊙ | O | O |
| 500 | — | X | O | O | O | O |
| 600 | — | — | X | X | Δ | Δ |

Then, the appropriate welding current range was determined for various radii of curvature R mm of the rotary electrode and the welding force W Kg, with the lapped with and the welding speed fixed at 0.4 mm and 12 m/min, respectively.

The marks for evaluation of current ranges are same as those used in table 3.

TABLE 4

| Welding force W (Kg) | Radius of curvature of rotary electrode R (mm) 40 | 50 | 100 | 150 | 250 |
|---|---|---|---|---|---|
| 80 | X | Δ | O | O | O |
| 100 | X | Δ | O | ⊙ | ⊙ |
| 150 | X | O | ⊙ | ⊙ | ⊙ |

Table 4 shows that tinfree steel can be successfully welded by the use of a rotary electrode having a diameter exceeding 50 mm.

The welded portion of a welded can body formed by a welding conducted with a rotary electrode having a radius of curvature of 150 mm, a welding force of 100 Kg, a welding speed of 12 m/min and a welding current of 4,500 A, was observed microscopically at a section perpendicular to the welding direction. The result was substantially same as that of Example 7 (FIG. 26) which will be mentioned later.

EXAMPLE 4

A can body preform having an inside diameter of 74.0 mm and a body length of 134.3 mm was made from a tinfree steel sheet of 0.23 mm thick, having a metallic chromium layer of a chromium amount of 102 mg/m$^2$ and a chromium oxide layer of a chromium amount of 15 mg/m$^2$. The lapped portion of this preform was welded making use of the apparatus of the type shown in FIGS. 14 and 15 to form a welded can body.

A.C. power of 50 Hz was used as the welding power source. Chrome-containing copper, which is a commercially available material for resistance welding electrode, was used as the material of the electrode for carrying out this embodiment. The welding was conducted under the condition of a lapping width of 0.4 mm, a radius of curvature of the rotary electrode of 250 mm, a welding speed of 12 m/min., and a welding current of 4,200 A. A satisfactory welded portion similar to that of Example 3 was observed.

EXAMPLE 5

A can body preform was made from a tinfree steel sheet of 0.17 mm thick and having a metallic chromium layer having chromium of 102 mg/m$^2$ and a chromium oxide layer containing chromium of 12 mg/m$^2$. The preform had an inside diameter of 65.3 mm and a body length of 125.4 mm. The lapped portion of the preform was welded by the apparatus of the type shown in FIGS. 17 and 18 to form a welded can body. A.C. power of 50 Hz was used as the welding power source. A commercially availabe electric soft copper wire of 1.5 mm dia. was rolled to have a generally rectangular cross-section with curved side surface and a width and thickness of about 2 mm and 1 mm, respectively. The welding was effected under the condition of a lapping width of 0.4 mm, a radius of curvature of the rotary electrode of 150 mm, a welding force of 80 Kg, a welding speed of 6 m/min. and a welding current of 3,200 A. A satisfactory welded portion similar to that of Example 3 was obtained.

EXAMPLE 6

A can body preform was formed from a tinfree steel sheet of 0.23 mm thick having a metallic chromium layer containing chromium of 99 mg/m$^2$ and a chromium oxide layer containing chromium of 11 mg/m$^2$. The preform had an inside diameter of 65.3 mm and a body length of 125.4 mm. The lapped portion of the preform was welded by the apparatus of the type shown in FIG. 6, to form a welded can body.

A.C. power of 50 Hz was used as the welding power. A commercially available electric soft copper wire of 1.5 mm dia. electrolytically plated with tin to have a thickness of about 5 $\mu$m was used as a wire electrode blank. The wire electrode was formed from this blank by rolling to have a generally rectangular cross-section of about 2 mm wide and 1 mm thick and curved side surfaces.

The relationship was determined between the welding force and the appropriate range of the welding current (effective value of sineous current) with which a satisfactory welded portion was obtained, under the condition of a lapping width of 0.4 mm, a radius of curvature of the rotary electrode of 150 mm and a welding speed of 12 m/min. At the same time, by way of reference, the same relationship was investigated with a copper wire electrode having no tin plating layer. The results of these tests are shown at Table 5 below.

TABLE 5

| Welding force (Kg) | appropriate range of welding current (A) | |
|---|---|---|
| | tin-plated soft copper wire | soft copper wire having no plating |
| 60 | 3,000–3,450 | 2,950–3,150 |
| 80 | 3,200–4,000 | 3,100–3,600 |
| 100 | 4,000–5,700 | 3,800–5,000 |
| 150 | 5,000–6,500 | 6,000–7,500 |

From Table 5, it will be seen that the appropriate range of the welding current is much increased with the tin-plated wire electrode, compared with the wire electrode having no tin-plating. This increase or widening of the appropriate welding current range provides an increase of capacity for absorbing the unstabilizing factors for the welding attributable to the possible fluctuation of the lapping width of the can body preform, welding force and so forth, and ensures a better quality of the welding.

Figure 24:
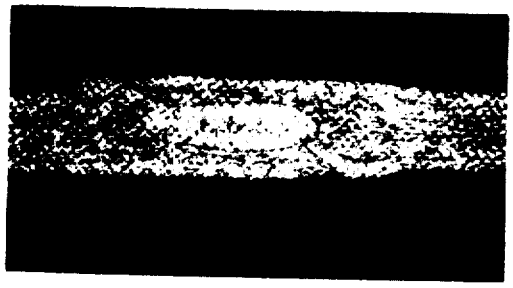
FIGS. 24, 25 and 26 are metallurgical microscopic photos of sections of welded portions formed from tinfree steel in accordance with the invention.

FIG. 24 shows the microscopic structure of the section of the welded portion obtained under the condition of a welding force of 100 Kg and a welding current of 5500 A (etched with 5% picral). The inner side of the can body is shown at the lower side of this photo.

The area around the sheet surfaces along the welding interface is solid phase welded, although a trace of a flat melt portion in parallel with the sheet surface is observed at the inside of the welded portion. The reason why the splash did not take place during the welding in spite of the generation of the melt portion is assumed that the melt portion was confined by the solid phase welded portion during the welding.

EXAMPLE 7

A tinfree steel sheet of 0.23 mm thick, having a metallic chromium layer containing chromium of 99 mg/m$^2$ and a chromium oxide layer containing chromium of 11 mg/m$^2$ was prepared. The surface which would constitute the inner surface of the can body was subjected to a so-called marging coating with an epoxy-phenol lacquer leaving both marginal edges to be welded uncoated. After effecting a marging coating and printing on the other side of the sheet, i.e. on the side which would constitute the outer side of the can body, the sheet was cut into blanks. This blank was shaped into a can body preform having an inside diameter of 65.3 mm and a body length of 125.4 mm. The lapped portion of this preform was welded by the apparatus of the type shown in FIGS. 1 and 2, to form a welded can body.

A.C. power of 50 Hz was used as the welding power source. A plurality of test weldings were conducted for various welding forces and welding currents, with the lap width, the radius of curvature of the rotary electrode and the welding speed of 0.4 mm, 150 mm and 12 m/min, respectively.

Figure 13:
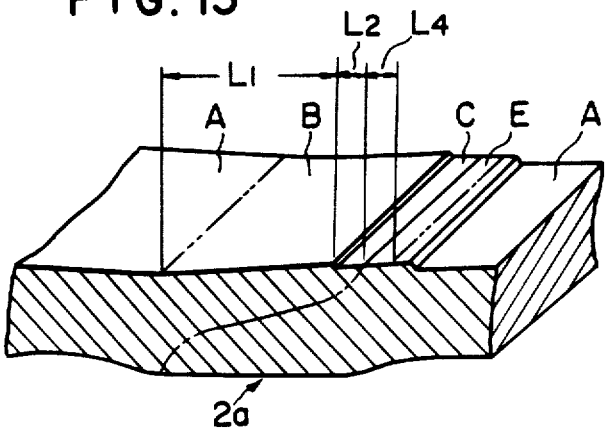
FIG. 13 is an illustration showing the welded surface of a different profile from that shown in FIG. 12.

The shape of the welded portion, particularly the width $L_1$ of the region B contacting the welding electrode, the width $L_2$ of the squeezed-out iron exposure region C, the height $L_3$ of the weld step, and the width $L_4$ of the region E where the chromium film is transformed, were investigated on the inner side of the weld can body thus obtained (see FIGS. 12 and 13).

Further, a small piece was cut out from the welded portion and carbon was vacuum evaporated to its surface corresponding to the inside of the can body. The substrate steel of the small piece was dissolved in a 5% alcohol solution of nitric acid and then the metallic chromium film was dissolved in thick hydrochloric acid so as to obtain a sample of thin film of the chromium oxide layer corresponding to the inside of can body. This sample was observed by an electron microscope to determine the covering area ratio of residual chromium oxide layer remaining in the region B contacting the welding electrode. In this case, the electrode contacting region B was divided into three sections of a first section closer to the iron exposure region C, a second section closer to the original tinfree steel region A and a central section. In each section, the area ratio of the residual chromium oxide layer was measured for 5 areas each of which has a size of 75 $\mu$m$\times$65 $\mu$m. The means of these ratios was calculated to obtain the covering area ratio of chromium oxide layer in the electrode contacting region B.

Figure 25:
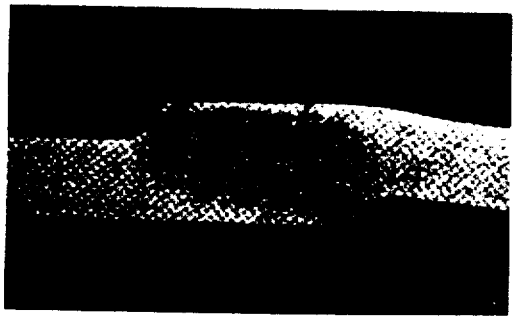
Figure 26:
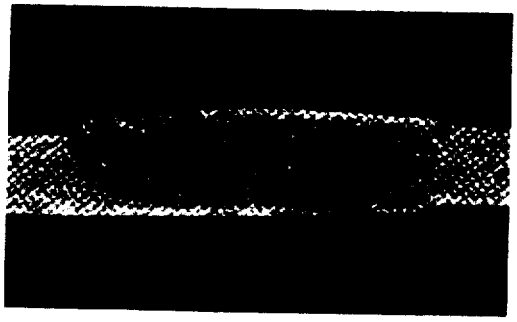

FIGS. 25 and 26 show, respectively, the microscopic photos of sections of welded portions perpendicular to the welding direction (magnification 60, etched with 4% naital solution) as obtained with 80 Kg welding force and 3.5 KA welding current (effective value of sineous current) and with 100 Kg welding force and 4.8 KA welding current.

Figure 27:
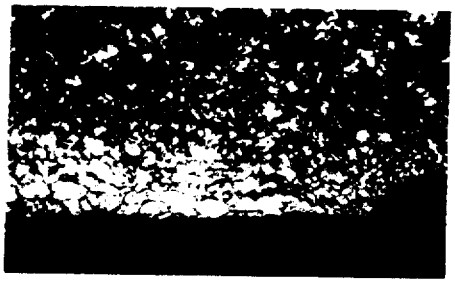
FIG. 27 is an enlarged photo of an essential part of the structure shown in FIG. 26.

Further, an elarged microscopic photo (magnification 340) for the surface area vicinity of the can inside shown at FIG. 26 is shown in FIG. 27. Most of surface regions, corresponding to the inner (the lower side of the photo) and outer (the upper side of the photo) sides of the can, have a metallurgical structure which is not substantially different from the ferrite structure of the matrix which is free from the welding effect. This tells that these surface regions are not so much affected thermally during the welding.

Figure 28:
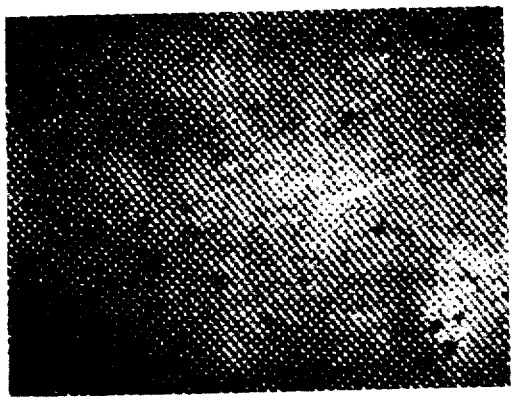
FIGS. 28 and 29 are transmission electron microscopic photos of the chromium oxide layers of the electrode-contact surfaces of the welded portions shown in FIGS. 25 and 26, respectively.
Figure 29:
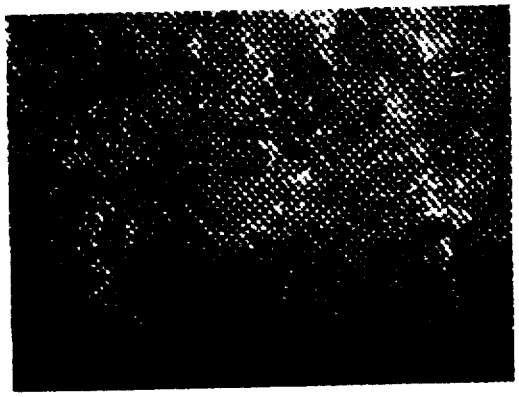

FIG. 28 shows a transmission electrode microscopic photo (magnification 1200) of the chromium oxide layer at the central section of the electrode contact region B at the inner side of the can body, as observed in the same sample as that used in the photo of FIG. 25. Further, a similar photo to that of FIG. 28, as observed in the same sample as that of FIG. 26, is shown in FIG. 29. In FIG. 28, the chromium oxide layer remains almost unchanged, while, in FIG. 29 showing the case of a high welding force and a large amount of mash, many cracks are formed as shown by white portions.

Figure 30:
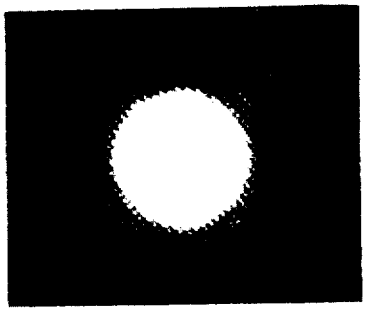
FIG. 30 is an electron-diffraction photo of a portion of the structure shown in FIG. 28.
Figure 31:
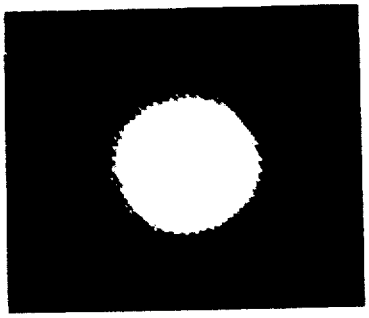
FIG. 31 is an electron-diffraction photo of a portion of the chromium oxide layer free from influence of the welding of tinfree steel.

FIGS. 30 and 31 show respectively electron diffraction photos of the chromium oxide layer shown at FIG. 28 and of the chromium oxide layer on the portion which is completely free from the influence of welding. The electrode diffraction photos of FIGS. 30 and 31 resemble each other. This means that the chromium oxide is amorphous in each case.

An epoxy-phenol resin lacquer as a repairing material was applied to the welded portion of the can inside over a width of about 7 mm to have a thickness of 10 to 20 μm after baking. Further, as another repairing material, a polyester film of 8 mm wide and 30 μm thick was heat-pressure bonded to the welded portion of the can inside. After the repair of the welded portion, the can body was subjected to a flange-formation step and a tinfree steel lid coated at its inside with an epoxy-phenol lacquer was secured to the can body by a double seam to form a can.

The above-mentioned can was packed with an aquous solution of NaCl of 1.5% by weight and then a tinfree steel lid similar to that mentioned above was secured by a double seam. The can was then subjected to a retort sterilization and stored for one month at 50° C. After the one month storage, the can was opened for the check of the states of corrosion of the welded portion at the inside of the can, the breakage of the repairing material or the separation of the same from the welded portion.

By way of reference, there was prepared a tinfree steel blank in which substrate iron was locally exposed by previously removing the surface layer in the area of the welding portion and its vicinity. A welded can body was made from this blank in the same manner as described above, and the same test was conducted with this reference can. The width of the iron exposed portion of the welded can body was about 2 mm.

As will be understood from Table 6, the welded can body of the invention exhibits satisfactory properties. Particularly, it is to be noted that the adhesion between the welded surface and the repairing material is improved as the covering area ratio of the residual chromium oxide layer in the electrode-contacting region B is increased, so that the corrosion resistance is improved at the welded portion.

TABLE 6

| sample No. | | | This invention 1 | 2 | 3 | 4 | 5 | conventional method reference 1 |
|---|---|---|---|---|---|---|---|---|
| welding condition | | welding force (Kg) | 60 | 80 | 100 | 100 | 150 | 100 |
| | | welding current (KA) | 3 | 3.5 | 4.0 | 4.8 | 5.5 | 4.8 |
| shape of welded portion | | $L_1$ (mm) | 0.54 | 0.56 | 0.58 | 0.60 | 0.60 | |
| | | $L_2$ (mm) | 0.02 | 0.08 | 0.09 | 0.10 | 0.14 | 0.70 |
| | | $L_3$ (mm) | 0.15 | 0.08 | 0.04 | 0 | 0 | 0.05 |
| | | $L_4$ (mm) | 0 | 0 | 0.02 | 0.05 | 0.10 | — |
| covering area ratio of residual chromium oxide layer in region B (%) | | | 95 | 90 | 70 | 60 | 30 | 0 |
| evaluation after 50° C. × 1 month storage | epoxy-phenol regin lacquer | state of repairing material | no change | no change | no change | no change | slight local separation | separation over entire region |
| | | state of welded portion | normal | normal | normal | normal | slight local corrosion | corrosion over entire welded portion |
| | polyester film | state of repairing material | no change | no change | no change | no change | no change | separation and breakage |
| | | state of welded portion | normal | normal | normal | normal | normal | corrosion over entire welded portion |

EXAMPLE 8

A welded can body having an inside diameter of 65.3 mm and a body length of 125.4 mm was formed by the same way as the example 7 from a tinfree steel sheet of 0.23 mm thick, having a metallic chromium layer containing chromium of 102 mg/m$_2$ and a chromium oxide layer containing chromium of 15 mg/m$^2$.

A plurality of test weldings were made with various welding currents, under the condition of a lapping width of 0.4 mm, a radius of curvature of the rotary electrode of 150 mm, a welding force of 100 Kg and a welding speed of 9 m/sec. The adjustment of the welding current was made through changing the primary voltage of the A.C. power source (commercial power of 50 Hz), and the welding current was measured during the welding.

As a result, a tinfree steel can body having a sound welded portion with satisfactory welding strength and sealing property and free from splash of molten iron was obtained with the welding current (effective value of sineous current) range of 3.7 KA to 4.5 KA.

Also, it was confirmed that the welding strength or the sealing performance is lowered as the welding current is reduced below 3.7 KA, while a welding current exceeding 4.5 KA tends to cause a splash of molten iron.

The shape of the welded portion at the inside of the can body, particularly such as the width $L_1$ of the electrode contacting region B, the width $L_2$ of the squeezed-out iron exposure region C, the height $L_3$ of the step and the width $L_4$ where the region E of the chromium film is transformed was investigated (see FIGS. 12, 13), and the surface of the welded portion was observed by an electron microscope to know the covering area ratio of the residual chromium oxide layer in the electrode contacting region B in the same manner as the Example 7.

Thereafter, an epoxy-phenol lacquer was applied to the welded portion at the inside and outside of the welded can body to have a thickness of 20 to 30 μm after the baking. The can body was then subjected to flange-formation and a tinfree steel lid coated at its inside with an epoxy-phenol lacquer was secured to the can body by double seaming to form a can. The can was packed with boiled salmon. Then, another tinfree steel lid was secured to the can body by double seaming and the can was subjected to retort sterilization. The can was opened after a 6-month storage at 50° C., to investigate the state of corrosion of the welded portion at the inside of the can, as well as the state of generation of sulfide blackening. Also, the number of perforated cans was checked. Each sample lot contained 100 pieces of cans. The result of this test is shown in Table 7.

By way of reference, a welded can body was made in the same way using a blank in which the surface chromium film on the welded portion and its vicinity was previously removed to locally expose the iron matrix. This reference can was subjected to the same test as above. The width of the exposed iron portion of the welded can body was about 2 mm. The test result with this reference can is also shown in Table 7.

From Table 7, it will be seen that the welded can body of the invention exhibits a superior performance to that of the conventional can body.

TABLE 7

| | Sample No. | This invention 6 | 7 | 8 | 9 | conventional method reference 2 |
|---|---|---|---|---|---|---|
| | welding current (KA) | 3.7 | 4.0 | 4.5 | 4.8 | 4.3 |
| | splash at the can inside | none | none | none | slight | none |
| shape of welded portion | $L_1$ (mm) | 0.58 | 0.58 | 0.60 | 0.58 | 0.70 |
| | $L_2$ (mm) | 0.07 | 0.10 | 0.12 | 0.14 | |
| | $L_3$ (mm) | 0.06 | 0.03 | 0 | 0 | 0.05 |
| | $L_4$ (mm) | 0.02 | 0.05 | 0.10 | 0.15 | — |
| | covering area ratio of chromium oxide layer in region B (%) | 90 | 80 | 50 | 30 | 0 |
| evaluation after 6 months × 50° C. storage | shape of welded portion at the can inside | normal | normal | normal | corrosion | corrosion over entire welded portion |
| | state of sulfide blackening | normal | normal | normal | locally blackening | blackening over entire welded portion |
| | number of perforated cans | 0 | 0 | 0 | 0 | 9 |

What is claimed is:

1. A method of making a tinfree steel can body having a mash welded side seam from a blank of a tinfree steel, said tinfree steel having a surface chromium layer consisting of a metallic chromium layer of 20~200 mg/m² and a chromium oxide layer thereof of 5~30 mg/m² in terms of chromium which comprises preparing a can body preform having a side lapped portion, formed from the blank of said tinfree steel whose opposite marginal portions to be overlapped remain as they are without removing said surface chromium layer, said lapped portion being formed by overlapping said marginal portions, so that the width of said lapped portion is 0.2~1.2 mm;

providing a cooled elongated electrode having an electrode surface the width of which is greater than that of said lapped portion, and a cooled rotary electrode opposite to said elongated electrode and having an electrode surface the width of which is greater than that of said lapped portion, and a radius of curvature of at least 50 mm;

placing said can body preform such that the inner side of said lapped portion is opposed to said electrode surface of said elongated electrode;

moving said rotary electrode in the direction of said lapped portion while pressing the whole width of said lapped portion between said electrode surfaces of said elongated electrode and said rotary electrode with a welding force of 40 to 500 kg and satisfying the relationship of $1/100 \leqq L/W \leqq 1/00$, wherein L is the width of said lapped portion in mm and W is the welding force in kg; and simultaneously, applying an A.C. current between said elongated electrode and said rotary electrode, and seam resistant welding said lapped portion, so as to form a mash welded side seam whose thickness is 1.0 to 1.6 times as large as the thickness of the blank of said tinfree steel, at least the portion of the inner surface of said side seam which was brought into contact with said elongated electrode being covered with said surface chromium layer.

2. A method of making a tinfree steel can body having a mash welded side seam from a blank of a tinfree steel, said tinfree steel having a surface chromium layer consisting of a metallic chromium layer of 20~200 mg/m² and a chromium oxide layer thereon of 5~30 mg/m² in terms of chromium which comprises preparing a can body preform having a side lapped portion, formed from the blank of said tinfree steel whose opposite marginal portions to be overlapped remain as they are without removing said surface chromium layer, said lapped portion being formed by overlapping said marginal portions, so that the width of a said lapped portion is 0.2 ~ 1.2 mm;

providing a cooled elongated electrode having an electrode surface the width of which is greater than that of said lapped portion, and a cooled rotary electrode opposite to said elongated electrode and having an electrode surface the width of which is greater than that of said lapped portion, and a radius of curvature of at least 50 mm;

placing said can body preform such that the inner side of said lapped portion is opposed to said electrode surface of said elongated electrode;

moving said can body preform together with said elongated electrode in the axial direction thereof while pressing the whole width of said lapped portion between said electrode surfaces of said elongated electrode and said rotary electrode with a welding force of 40 to 500 kg and satisfying the relationship of $1/1000 \leqq L/W \leqq 1/100$, wherein L is the width of said lapped portion in mm and W is the welding force in kg; and simultaneously, applying an A.C. current between said elongated electrode and said rotary electrode, and seam resistant welding said lapped portion, so as to form a mash welded side seam whose thickness is 1.0 to 1.6 times as large as the thickness of the blank of said tinfree steel, at least the portion of the inner surface of said side seam which was brought into contact with said elongated electrode being covered with said surface chromium layer.

3. A method of making a tinfree steel can body having a mash welded side seam from a blank of a tinfree steel, said tinfree steel having a surface chromium layer consisting of a metallic chromium layer of 20 ~ 200 $mg/m^2$ and a chromium oxide layer thereon of 5 ~ 30 $mg/m^2$ in terms of chromium which comprises preparing a can body preform having a side lapped portion, formed from the blank of said tinfree steel whose opposite marginal portions to be overlapped remain as they are without removing said surface chromium layer, said lapped portion being formed by overlapping said marginal portions, so that the width of said lapped portion is 0.2 ~ 1.2 mm;

providing a cooled elongated electrode, and a cooled rotary electrode opposite to said elongated electrode and having a radius of curvature of at least 50 mm;

preparing a first wire electrode contacting said elongated electrode and movable along said elongated electrode, said first wire electrode having an electrode surface of a width greater than that of said lapped portion, and a second wire electrode contacting said rotary electrode and movable along said rotary electrode, said second wire electrode having an electrode surface of a width greater than that of said lapped portion;

placing said can body preform such that the inner side of said lapped portion is opposed to [said] *an* electrode surface of said elongated electrode;

moving said rotary electrode in the direction of said lapped portion while pressing the whole width of said lapped portion between said electrode [surfaces] *surface* of said elongated electrode and *an electrode surface of* said rotary electrode with a welding force of 40 to 500 kg and satisfying the relationship of $1/1000 \leqq L/W \leqq 1/100$, wherein L is the width of said lapped portion in mm and W is the welding force in kg; and simultaneously, applying an A.C. current between said elongated electrode and said rotary electrode, and seam resistant welding said lapped portion, so as to form a mash welded side seam whose thickness is 1.0 to 1.6 times as large as the thickness of the blank of said tinfree steel, at least the portion of the inner surface of said side seam which was brought into contact with said [elongated] *first wire* electrode being covered with said surface chromium layer.

4. A method of making a tinfree steel can body having a mash welded side seam from a blank of a tinfree steel, said tinfree steel having a surface chromium layer consisting of a metallic chromium layer of 20 ~ 200 $mg/m^2$ and a chromium oxide layer thereon of 5 ~ 30 $mg/m^2$ in terms of chromium which comprises preparing a can body preform having a side lapped portion, formed from the blank of said tinfree steel whose opposite marginal portions to be overlapped remain as they are without removing said surface chromium layer, said lapped portion being formed by overlapping said marginal portion, so that the width of said lapped portion is 0.2 ~ 1.2 mm;

providing a cooled elongated electrode, and a cooled rotary electrode opposite to said elongated electrode and having a radius of curvature of at least 50 mm;

preparing a first wire electrode contacting said elongated electrode and movable along said elongated electrode, said first wire electrode having an electrode surface of a width greater than that of said lapped portion, and a second wire electrode contacting said rotary electrode and movable along said rotary electrode, said second wire electrode having an electrode surface of a width greater than that of said lapped portion;

placing said can body preform such that the inner side of said lapped portion is opposed to said electrode surface of said elongated electrode;

moving said can body preform together with said elongated electrode in the axial direction thereof while pressing the whole width of said lapped portion between [said] *an* electrode surface of said elongated and *an electrode surface of* said rotary electrode with a welding force of 40 to 500 kg and satisfying the relationship of $1/1000 \leqq L/W \leqq 1/100$, wherein L is the width of said lapped portion in mm and W is the welding force in kg; and simultaneously, applying an A.C. current between said elongated electrode and said rotary electrode, and seam resistant welding said lapped portion, so as to form a mash welded side seam whose thickness is 1.0 to 1.6 times as large as the thickness of the blank of said tinfree steel, at least the portion of the inner surface of said side seam which was brought into contact with said [elongated] *first wire* electrode being covered with said surface chromium layer.

5. A method of making a tinfree steel can body as claimed in claim [1, 2,] 3, or 4, wherein said chromium oxide layer covers the area of at least 30% of the total area of the portion of the inner surface of said side seam which was brought into contact with said [elongated] *first wire* electrode.

6. A method of making a tinfree steel can body as claimed in claim 3 or 4, wherein said *first* wire electrode [is] *and said second wire electrode are* coated with a thin tin layer at least on the [surface] *surfaces* thereof in contact with said lapped portion.

7. A method of making a tinfree steel can body as claimed in claim 6, wherein the thickness of said tin layer is not greater than 30 μm.

*8. A method of making a tinfree steel can body as claimed in claim 1 or 2, wherein said chromium oxide layer covers the area of at least 30% of the total area of the portion of the inner surface of said side seam which was brought into contact with said elongated electrode.*

* * * * *